US010530758B2

(12) United States Patent
Cai et al.

(10) Patent No.: US 10,530,758 B2
(45) Date of Patent: Jan. 7, 2020

(54) METHODS OF COLLABORATIVE HARDWARE AND SOFTWARE DNS ACCELERATION AND DDOS PROTECTION

(71) Applicant: F5 Networks, Inc., Seattle, WA (US)

(72) Inventors: Hao Cai, Sammamish, WA (US); Paul Imre Szabo, Shoreline, WA (US); Christopher Ryan Baker, Seattle, WA (US); Lisa M. Golden, Seattle, WA (US); Robert Andrew Kovalchik, Seattle, WA (US); Amit Fridman, Yehud (IL); Alan Brian Mimms, Puyallup, WA (US); Itai Druckmann, Petah-Tikva (IL)

(73) Assignee: F5 Networks, Inc., Seattle, WA (US)

( * ) Notice: Subject to any disclaimer, the term of this patent is extended or adjusted under 35 U.S.C. 154(b) by 240 days.

(21) Appl. No.: 15/382,018

(22) Filed: Dec. 16, 2016

(65) Prior Publication Data

US 2017/0214677 A1    Jul. 27, 2017

Related U.S. Application Data

(60) Provisional application No. 62/269,502, filed on Dec. 18, 2015.

(51) Int. Cl.
*H04L 29/06* (2006.01)
*H04L 29/12* (2006.01)
(Continued)

(52) U.S. Cl.
CPC ............ *H04L 63/08* (2013.01); *H04L 61/106* (2013.01); *H04L 61/1511* (2013.01);
(Continued)

(58) Field of Classification Search
CPC ... H04L 63/08; H04L 61/106; H04L 61/1511; H04L 63/10; H04L 63/1458; H04L 67/1097; H04L 67/34; G06F 17/30864
(Continued)

(56) References Cited

U.S. PATENT DOCUMENTS 6,591,306 B1 * 7/2003 Redlich ............. H04L 29/12018
370/401
7,188,175 B1 * 3/2007 McKeeth .......... H04L 29/12066
370/356
(Continued)

OTHER PUBLICATIONS

International Search Report and Written Opinion for International Application No. PCT/US2016/067370 dated Apr. 3, 2017, 12 pages.
(Continued)

*Primary Examiner* — Shahriar Zarrineh
(74) *Attorney, Agent, or Firm* — John W. Branch; Lowe Graham Jones PLLC

(57) ABSTRACT

Embodiments are directed towards managing name service communications. A name service device may be arranged to employ a hardware domain name service (DNS) processor to receive a name service query. The hardware DNS processor may perform operations on the name service query. If operations performed by the hardware DNS processor do not resolve the name service query, further operations may be performed. The name service device may be arranged to provide a name service reply that includes the answer to the name service query. And, the name service device may be arranged to send the name service reply back to the hardware DNS processor. Accordingly, the hardware DNS processor on the name service device may send the name service reply that includes at least an answer to the name service query to the requesting computers.

15 Claims, 13 Drawing Sheets

(51) Int. Cl.
*H04L 29/08* (2006.01)
*G06F 16/951* (2019.01)
(52) U.S. Cl.
CPC .......... *H04L 63/10* (2013.01); *H04L 63/1458* (2013.01); *H04L 67/1097* (2013.01); *H04L 67/34* (2013.01); *G06F 16/951* (2019.01)
(58) Field of Classification Search
USPC .......................................................... 726/4
See application file for complete search history.

(56) References Cited

U.S. PATENT DOCUMENTS

| | | | | |
|---|---|---|---|---|
| 7,555,542 | B1* | 6/2009 | Ayers | H04L 29/06 709/220 |
| 7,840,557 | B1* | 11/2010 | Smith | G06F 12/0875 707/722 |
| 8,832,283 | B1* | 9/2014 | Roskind | G06F 15/16 709/223 |
| 2002/0010798 | A1* | 1/2002 | Ben-Shaul | G06F 17/3089 709/247 |
| 2003/0084038 | A1* | 5/2003 | Balogh | G06F 9/505 |
| 2006/0036720 | A1* | 2/2006 | Faulk, Jr. | H04L 41/0622 709/223 |
| 2006/0095585 | A1* | 5/2006 | Meijs | H04L 12/4633 709/245 |
| 2007/0002778 | A1* | 1/2007 | Shi | H04L 29/12018 370/260 |
| 2007/0041393 | A1* | 2/2007 | Westhead | H04L 29/12066 370/428 |
| 2008/0019267 | A1* | 1/2008 | Ku | H04L 61/157 370/229 |
| 2008/0104182 | A1* | 5/2008 | Jimmei | H04L 29/12066 709/206 |
| 2009/0063704 | A1* | 3/2009 | Taylor | H04L 29/12066 709/245 |
| 2009/0089441 | A1 | 4/2009 | Taylor et al. | |
| 2009/0177798 | A1* | 7/2009 | Bogner | H04L 29/12066 709/245 |
| 2009/0319367 | A1* | 12/2009 | Sullivan | G06Q 30/0246 705/14.45 |
| 2010/0031362 | A1 | 2/2010 | Himberger et al. | |
| 2010/0036969 | A1* | 2/2010 | Perry | H04L 29/12066 709/245 |
| 2010/0131646 | A1* | 5/2010 | Drako | H04L 29/12066 709/225 |
| 2010/0269174 | A1* | 10/2010 | Shelest | H04L 29/12066 726/22 |
| 2010/0318681 | A1* | 12/2010 | Shi | G06F 15/16 709/245 |
| 2010/0332680 | A1 | 12/2010 | Anderson et al. | |
| 2011/0029398 | A1* | 2/2011 | Boudville | G06F 17/3087 705/26.1 |
| 2011/0145316 | A1* | 6/2011 | Ait-Ameur | H04L 29/12066 709/203 |
| 2011/0153840 | A1* | 6/2011 | Narayana | H04L 67/1029 709/227 |
| 2011/0282868 | A1* | 11/2011 | Ishii | G06F 17/30011 707/722 |
| 2012/0030350 | A1* | 2/2012 | Katakura | H04L 61/106 709/224 |
| 2012/0113893 | A1* | 5/2012 | Damola | H04L 12/4633 370/328 |
| 2013/0013739 | A1 | 1/2013 | Grimault et al. | |
| 2013/0111065 | A1* | 5/2013 | Donley | H04L 69/22 709/245 |
| 2013/0145153 | A1* | 6/2013 | Brown | G06F 21/6263 713/156 |
| 2013/0173769 | A1* | 7/2013 | Seastrom | H04L 61/1511 709/223 |
| 2013/0275570 | A1* | 10/2013 | Treuhaft | H04L 61/1511 709/223 |
| 2013/0279414 | A1* | 10/2013 | Damola | H04L 29/12066 370/328 |
| 2013/0297596 | A1* | 11/2013 | Mouline | H04L 67/1008 707/724 |
| 2014/0068043 | A1* | 3/2014 | Archbold | H04L 61/1511 709/223 |
| 2014/0150051 | A1 | 5/2014 | Bharali et al. | |
| 2014/0304409 | A1* | 10/2014 | Kamath | H04L 67/1036 709/225 |
| 2015/0120909 | A1* | 4/2015 | Karthikeyan | H04L 61/1511 709/224 |
| 2015/0207812 | A1* | 7/2015 | Back | H04L 63/1441 726/23 |
| 2015/0237001 | A1* | 8/2015 | Ivanov | H04L 61/2007 709/245 |
| 2015/0295882 | A1* | 10/2015 | Kaliski, Jr. | H04L 61/106 709/217 |
| 2016/0028847 | A1* | 1/2016 | Bradshaw | H04L 67/2842 709/213 |
| 2016/0087933 | A1* | 3/2016 | Johnson | H04W 4/70 709/245 |
| 2016/0197898 | A1* | 7/2016 | Hozza | H04L 63/0442 713/168 |
| 2016/0241509 | A1* | 8/2016 | Akcin | H04L 67/10 |
| 2016/0270142 | A1* | 9/2016 | Olsson | H04W 36/0083 |
| 2016/0308821 | A1* | 10/2016 | Siba | H04L 61/2007 |
| 2017/0093802 | A1* | 3/2017 | Norum | H04L 63/0428 |

OTHER PUBLICATIONS

F5 Networks, Inc., "Deploying the BIG-IP GTM for DNSSEC," https://www.f5.com/pdf/deployment-guides/gtm-dnssec-dg.pdf, Version 1.2, accessed Jan. 10, 2017, 16 pages.
Steve Friedl's Unixwiz.net Tech Tips, "An Illustrated Guide to the Kaminsky DNS Vulnerability," http://unixwiz.net/techtips/iguide-kaminsky-dns-vuln.html, 13 pages.
P. Mockapetris, "Domain Names—Concepts and Facilities," https://tools.ietf.org/html/rfc1034, Nov. 1987, 56 pages.
P. Mockapetris "Domain Name—Implementation and specification," https://tools.ietf.org/html/rfc1035, Nov. 1987, 56 pages.
R. Arends et al., "DNS Security Introduction and Requirements," https://tools.ietf.org/html/rfc4033, Mar. 2005, 22 pages.
R. Arends et al., "Resource Records for the DNS Security Extensions," https://tools.ietf.org/html/rfc4034, Mar. 2005, 30 pages.
R. Arends et al., "Protocol Modifications for the DNS Security Extensions," https://tools.ietf.org/html/rfc4035, Mar. 2005, 54 pages.
JH Software, Simple DNS Plus "Check DNSSEC Signatures Tool," http://support.simpledns.com/kb/a173/check-dnssec-signatures-tool.aspx, Jul. 14, 2009, 4 pages.
Cisco, "Preparing for DNSSEC: Best Practices, Recommendations, and Tips for Successful Implementation," http://www.cisco.com/c/en/us/about/security-center/dnssec-best-practices.html accessed Jan. 10, 2017, 15 pages.
N. Brownlee, "DNS+DNSSEC: System Operation, Resource Records & Packet Formats," https://www.cs.auckland.ac.nz/courses/compsci742s2c/lectures/dns-4up.pdf, 2014, 7 pages.
W. Wijngaards, "Unbound Validating Caching Resolver," http://meetings.ripe.net/ripe-56/presentations/Wijngaards-Unbound_DNSSEC__Validating_Resolver.pdf, May 2008, 15 pages.

* cited by examiner

METHODS OF COLLABORATIVE HARDWARE AND SOFTWARE DNS ACCELERATION AND DDOS PROTECTION

CROSS-REFERENCE TO RELATED APPLICATIONS

This application is a Utility Patent application based on a previously filed U.S. Provisional Patent Application U.S. Ser. No. 62/269,502 filed on Dec. 18, 2015, the benefit of the filing date of which is hereby claimed under 35 U.S.C. § 119(e) and which is further incorporated by reference in its entirety.

TECHNICAL FIELD

The present invention relates generally to network traffic management and, more particularly, but not exclusively to methods for improving the performance of network name services.

BACKGROUND

High performance/high availability client-server computing systems require a robust and high performing Domain Name System (DNS) to facilitate communication with other computers/services that may be on the network. DNS servers may be available to provide name services. Further, one or more local and/or well-known DNS servers may be arranged to provide name services for one or more network domains. Also, in some circumstances a local/well-known DNS server may have to retrieve information from one or more remote/external DNS servers which information is in turn provided to clients of the local DNS server. Unfortunately, the domain name system used by some computers may be vulnerable to various malicious attacks that may interfere with the operations of computing systems. DNS services may be subject to denial of service attacks, man-in-the-middle attacks between the DNS servers and the clients, man-in-the-middle attacks between the local DNS server and external DNS servers, or the like, or combination thereof. Also, as computing systems scale larger and larger the performance of the DNS servers must increase as well. Further, legacy pure software based DNS systems may have difficulty meeting the ever increasing high throughput that may be required of modern DNS services. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
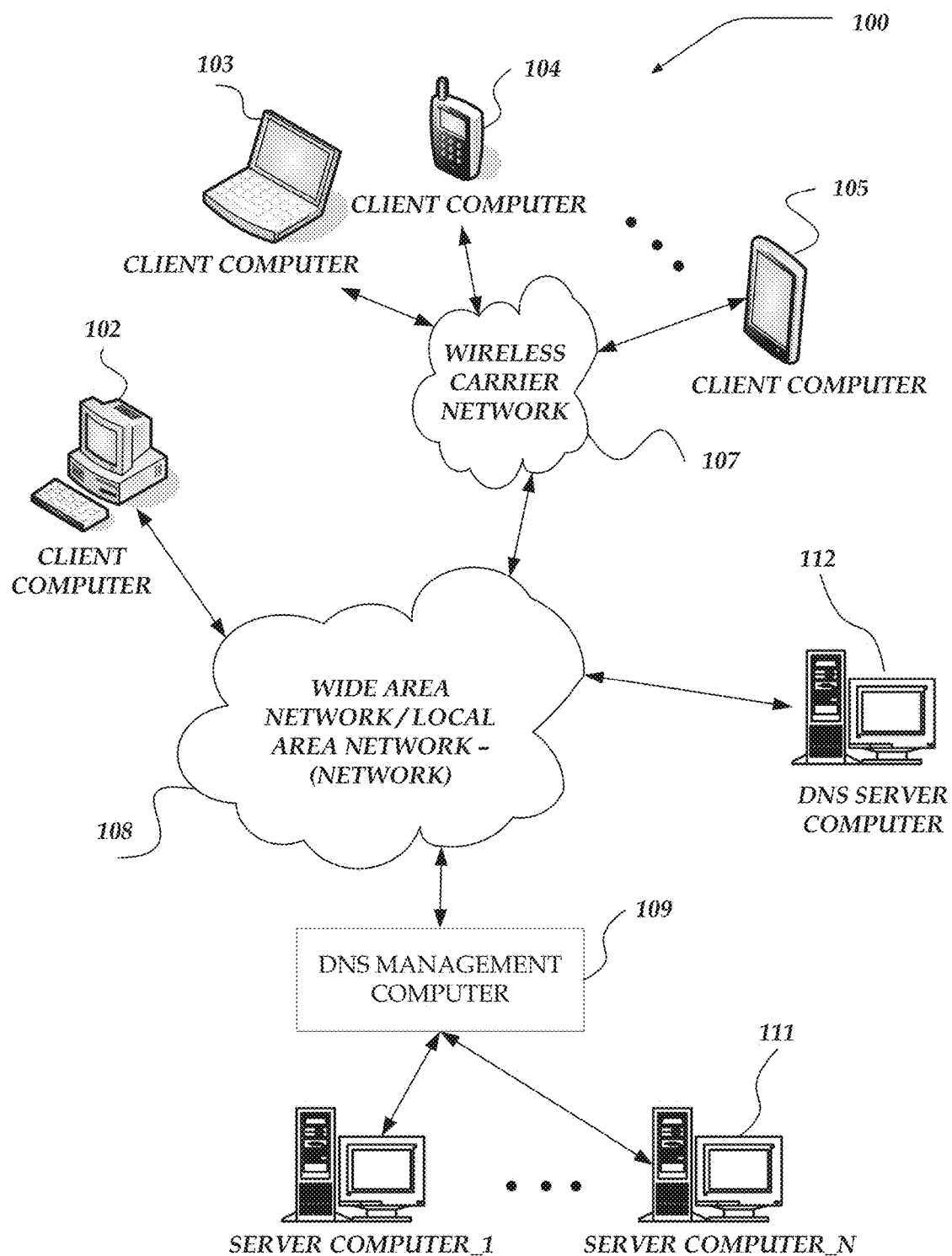
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Also, throughout the specification and the claims, the use of "when" and "responsive to" do not imply that associated resultant actions are required to occur immediately or within a particular time period. Instead they are used herein to indicate actions that may occur or be performed in response to one or more conditions being met, unless the context clearly dictates otherwise. In addition, throughout the specification, the meaning of "a," "an," and "the" include plural references. The meaning of "in" includes "in" and "on."

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

As used herein, the term "tuple" refers to a set of values that identify a source and destination of a network packet, which may, under some circumstances, be a part of a network connection. In one embodiment, a 5 tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. In at least one of the various embodiments, source port numbers may be a TCP source port number. Likewise, in at least one of the various embodiments, destination port number may be a TCP destination port number. In at least one of the various embodiments, tuples may be used to identify network flows (e.g., connection flows). However, a tuple need not be a 5 tuple, and other combinations of the above may also be used. For example, a tuple may be a four-tuple, using a source IP address, a destination IP address, a source port number, and a destination port number. Other combinations are also considered. Moreover, as used herein, a "flow key" refers to a key that may be generated based on a tuple comprising some combination of fields specific to the embodiments need extracted from a network packet header, including those fields identified above.

As used herein, the terms "network flow," "connection flow,", or "flow" may refer to a network session established between two endpoints. In at least one of the various embodiments, a tuple may uniquely identify the flow. In at least one of the various embodiments, flow routing data associated with connection flows may be used to ensure that the network packets sent between the endpoints of a connection flow may be routed along the same path. In at least one of the various embodiments, the performance of connection oriented network protocols such as TCP/IP may be impaired if network packets may be routed using varying paths and/or directed to different endpoints. Further, one or more protocol options may be associated with a flow enabling the endpoints to employ one or more features of the protocol that may be otherwise optional.

As used herein the terms "network destination," or "network address" refer to a name or number used to identify one or more items, objects, services, and/or locations in a communication network. In some cases, the network destination and/or network address may represent a single unique endpoint on the network. In other cases, the network destination and/or network address may represent of one or more endpoints each sharing one or more similar network communication attributes and/or characteristics. In at least one of the various embodiments, the elements that comprise tuples may be considered network destinations and/or components of a network destination. Also, network destinations may be defined using one or more sub-networking masks, wildcards, matching patterns, or the like. Network communication/monitoring/metrics may be directed to one or more network destinations.

As used herein the term "network traffic" refers to data and/or information communicated over a network flow. This information may be arranged according to the underlying network technology (e.g., Ethernet, Token Ring, ATM, or the like). Also, the information may be further arranged based on the network protocols (e.g., Transmission Control Protocol (TCP), User Datagram Protocol (UDP), Secure Shell (SSH), File Transfer Protocol (FTP), or the like) that are being used. Network traffic is often described in terms of packets, bytes, frames, streams, channels, or the like, depending on the applications and protocols being employed.

As used herein the term "policy rule" refers to conditions and actions that may be paired together such that if a condition is met then the corresponding action may be executed. In at least one of the various embodiments, conditions may be compound conditions comprised of multiple conditions. In at least one of the various embodiments, actions may also be compound actions, or in other words, multiple actions may be associated with a condition and/or a policy rule. Policy rules may be arranged to perform various network traffic management actions on network traffic, such as, load balancing, network flow steering, firewalling, modifying traffic data, enforcing security, caching, compression, decompression, cryptographic operations, proxying, traffic routing, traffic switching, bandwidth shaping, quota tracking, or the like.

As used herein the term "policy" refers to a plurality of policy rules grouped together based on reasons, such as, semantic similarity, domain similarity, or the like. In at least one of the various embodiments, policy rules may be grouped into policies for any arbitrary reason to support the network management goals of a user/administrator of a traffic management device or name service device.

As used herein the term "Domain Name System (DNS)" refers to one or more computers that are arranged to maintain a hierarchal index that maintains a mapping of network names to network resources. A typical example maintains a mapping of network names to network addresses and an additional "reverse" mapping of network addresses to network names. DNS servers may generate and communicate responses to requests that are sent from client computers, network computers, server computers, other DNS server computers, or the like. Commonly, a DNS query will include a name, such as a domain name, and/or hostname of a computer server. The DNS server will look up the name in its index and return the network address that is associated with the name provided by the request (if any). Also, DNS servers may be arranged to perform reverse lookups that return the hostname/domain name of computer from a valid network address. In some cases, when the information to answer a valid request is unavailable locally, a DNS server may be arranged to request the information from another DNS server. Further, DNS uses one or more well-known protocols for communicating over networks.

As used herein the term "Domain Name System Security Extensions (DNSSEC)" refers to a specification/protocol for providing secure DNS services. Generally, DNS SEC provides cryptographic authentication of its replies rather than encryption of the replies.

Briefly stated, embodiments are directed towards managing name service communications. In at least one of the various embodiments, a name service device may be arranged to employ a hardware domain name service (DNS) processor to receive a name service query from one or more client computers. In at least one of the various embodiments, the hardware DNS processor may be arranged to perform at least one operation on the name service query. In at least one of the various embodiments, if operations performed by the hardware DNS processor do not resolve the name service query, a second processor on the name service device may be arranged to perform further operations. In at least one of the various embodiments, the name service device may be arranged to use the second processor to provide a name service reply that includes at least the answer to the name service query. And, in at least one of the various embodiments, the name service device may be arranged to send the name service reply back to the hardware DNS processor.

Accordingly, in at least one of the various embodiments, the hardware DNS processor on the name service device may be arranged to send a name service reply that includes at least an answer to the name service query to the one or more client computers. In at least one of the various embodiments, if the name service query is unresolved by the operations performed by the second processor of one or more name service devices, additional operations may be performed.

In at least one of the various embodiments, the name service device may be arranged to provide fingerprint information that may be based on at least the contents of name service query. Also, in at least one of the various embodiments, the name service device may be arranged to modify the name service query to include the fingerprint information. In at least one of the various embodiments, the name service device may be arranged to send, using a fourth processor on the one or more name service devices, the modified name service query to an external name service server. In at least one of the various embodiments, if the hardware DNS processor on the one or more name service devices receives a name service reply from one or more external name service servers it may perform actions to authenticate the name service reply.

In at least one of the various embodiments, the name service devices may be arranged to use a second processor on the name service device, to perform operations to provide fingerprint information that may be based on at least the contents of the name service reply.

In at least one of the various embodiments, the third processor on the one or more name service devices, may be arranged to perform one or more operations to compare the fingerprint information of the name service reply with other fingerprint information that may be associated with the name service query. If the comparison provides an affirmative result, the fourth processor on the one or more name service devices may assume that the name service reply is authentic.

Further, in at least one of the various embodiments, the hardware DNS processor, the second processor, the third processor, or a fourth processor may be the same processor. Likewise, in at least one of the various embodiments, at least one of the hardware DNS processor, the second processor, the third processor, or a fourth processor may be on the same name service device.

In at least one of the various embodiments, the hardware DNS processor on the name service device may be arranged to perform operations to provide an index value for a software DNS processor lookup table. Also, in at least one of the various embodiments, the hardware DNS processor on the one or more name service devices may be arranged to perform operations to provide a program that is associated with the software DNS processor. And, in at least one of the various embodiments, the hardware DNS processor on the name service device may be arranged to perform operations based on instructions included in the program.

Illustrated Operating Environment

FIG. 1 shows components of one embodiment of an environment in which the invention may be practiced. Not all of the components shown may be required to practice the invention, and variations in the arrangement and type of the components may be made without departing from the spirit or scope of the invention.

As shown, system 100 of FIG. 1 includes local area networks ("LANs")/wide area networks ("WANs")—(network) 108, wireless network 107, client computers 102-105, domain name system management computer ("DNSMC") 109, server computers 110-111, Domain name system server computer 112. Network 108 is in communication with and enables network traffic for communication between client computers 102-105, wireless network 107, DNSMC 109, and DNS server computer 112. Wireless carrier network 107 further enables communication with wireless devices, such as client computers 103-105. DNSMC 109 is in communication with network 108, server computers 110-111, and DNS server computer 112.

One embodiment of client computers 102-105 is described in more detail below in conjunction with FIG. 2. In one embodiment, at least some of client computers 102-105 may operate over a wired and/or a wireless network, such as networks 107 and/or 108. Generally, client computers 102-105 may include virtually any computer capable of communicating over a network to send and receive information, including instant messages, performing various online activities, or the like. It should be recognized that more or less client computers may be included within a system such as described herein, and embodiments are therefore not constrained by the number or type of client computers employed.

Computers that may operate as client computer 102 may include computers that typically connect using a wired or wireless communications medium, such as personal computers, servers, multiprocessor systems, microprocessor-based or programmable consumer electronics, network PCs, or the like. In some embodiments, client computers 102-105 may include virtually any portable computer capable of connecting to another computer and receiving information, such as laptop computer 103, smart phone 104, tablet computer 105, or the like. However, portable computers are not so limited and may also include other portable computers, such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client computers 102-105 typically range widely in terms of capabilities and features. Moreover, client computers 102-105 may provide access to various computing applications, including a browser, or other web-based applications.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client computer may employ the browser application to perform various activities over a network (online). However, another application may also be used to perform various online activities.

Client computers 102-105 also may include at least one other client application that is configured to receive and/or send data to another computer. The client application may include a capability to send and/or receive content, or the like. The client application may further provide information that identifies itself, including a type, capability, name, or the like. In one embodiment, client computers 102-105 may uniquely identify themselves through any of a variety of mechanisms, including a phone number, Mobile Identification Number ("MIN"), an electronic serial number ("ESN"), or other mobile computer identifier. The information may also indicate a content format that the mobile computer is enabled to employ. Such information may be provided in a network packet, or the like, sent between other client computers, DNSMC 109, server computers 110-111, DNS server computer 112, or other computers.

Client computers 102-105 may further be configured to include a client application that enables an end-user to log into an end-user account that may be managed by another computer, such as server computers 110-111, or the like. Such end-user account, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Wireless carrier network 107 is configured to couple client computers 103-105 and its components with network 108. Wireless carrier network 107 may include any of a variety of wireless sub-networks that may further overlay stand-alone ad-hoc networks, and the like, to provide an infrastructure-oriented connection for client computers 102-105. Such sub-networks may include mesh networks, Wireless LAN ("WLAN") networks, cellular networks, and the like. In one embodiment, the system may include more than one wireless network.

Wireless carrier network 107 may further include an autonomous system of terminals, gateways, routers, and the like connected by wireless radio links, and the like. These connectors may be configured to move freely and randomly and organize themselves arbitrarily, such that the topology of wireless carrier network 107 may change rapidly.

Wireless carrier network 107 may further employ a plurality of access technologies including 2nd (2G), 3rd (3G), 4th (4G) $5^{th}$ (5G) generation radio access for cellular systems, WLAN, Wireless Router ("WR") mesh, and the like. Access technologies such as 2G, 3G, 4G, 5G, and future access networks may enable wide area coverage for mobile computers, such as client computers 103-105 with various degrees of mobility. In one non-limiting example, wireless carrier network 107 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HSDPA"), Long Term Evolution ("LTE"), and the like. In essence, wireless carrier network 107 may include virtually any wireless communication mechanism by which information and/or network traffic may travel between client computers 103-105 and another computer, network, and the like.

Network 108 is configured to couple network computers with other computers, including, server computers 110-111, DNSMC 109, DNS server computer 112, client computer 102, and client computers 103-105 through wireless network 107. Network 108 is enabled to employ any form of computer readable media for communicating information in the form network traffic from one electronic device to another. Also, network 108 can include the Internet in addition to LANs, WANs, direct connections, such as through a universal serial bus ("USB") port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Network traffic communicated over a network may include various signals associated with the low level operation of the network, routing, as well as higher level communication for applications. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information or network traffic may travel between computers.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of DNSMC 109 is described in more detail below in conjunction with FIG. 3. Briefly, however, DNSMC 109 may include virtually any network computer capable of managing domain name system services and managing network traffic between client computers 102-105 and server computers 110-111. Such computers include, for example, routers, proxies, firewalls, load balancers, cache devices, computers that perform network address translation (NAT), application delivery controllers, or the like, or any combination thereof. DNSMC 109 may perform the operations of routing, translating, switching packets, name services, directory services, authoritative name services, non-authoritative name services, recursive name services, or the like. In one embodiment, DNSMC 109 may inspect incoming network packets, and may perform an address translation, port translation, a packet sequence translation, and the like, and route the network packets based, at least in part, on the packet inspection. In some embodiments, DNSMC 109 may perform actions related to one or more name service applications, including load balancing operations to determine a DNS server computer which to direct a request. Such load balancing operations may be based on network traffic, network topology, capacity of a DNS server, content requested, or a host of other traffic distribution mechanisms.

DNSMC 109 may include one or more software DNS server applications 322 and one or more separate DNS hardware processors 366, one or more DNS hardware caches 368. The software DNS server applications may include software-optimized operations that perform high-level control functions for DNS services. In at least one of the various embodiments, the software DNS server applications may be configured to manage DNS services that may be performed by DNS processor 366 and DNS hardware cache 368. In at least one embodiment, the software DNS server application may provide instructions, such as, for example, forwarding name service requests to other DNS servers, such as, DNS server computer 112, verifying name service responses, updating the DNS hardware cache, updating policies and/or programs executing on DNS processor 366, or the like, or combination thereof. The DNS processors may include hardware-optimized operations that perform statistics gathering, per-domain policy enforcement, responding to name service requests, caching, or the like.

Server computers 110-111 may include virtually any network computer that may operate as a website server. However, server computers 110-111 are not limited to website servers, and may also operate as messaging server, a File Transfer Protocol (FTP) server, a database server, content server, email servers, or the like. Additionally, each of server computers 110-111 may be configured to perform a different operation. Computers that may operate as server computers 110-111 include various network computers, including, but not limited to personal computers, desktop computers, multiprocessor systems, microprocessor-based or programmable consumer electronics, network PCs, server computers, network appliances, and the like.

Although FIG. 1 illustrates server computers 110-111 as single computers, the invention is not so limited. For example, one or more functions of each of server computers 110-111 may be distributed across one or more distinct network computers. Moreover, server computers 110-111 are not limited to a particular configuration. Thus, in one embodiment, server computers 110-111 may contain a plurality of network computers that operate using a master/slave approach, where one of the plurality of network computers of server computers 110-111 operate to manage and/or otherwise coordinate operations of the other network computers. In other embodiments, the server computers 110-111 may operate as a plurality of network computers within a cluster architecture, a peer-to-peer architecture, virtual machines, and/or even within a cloud architecture. Thus, the invention is not to be construed as being limited to a single environment, and other configurations, and architectures are also envisaged.

Illustrative Client Computer

Figure 2:
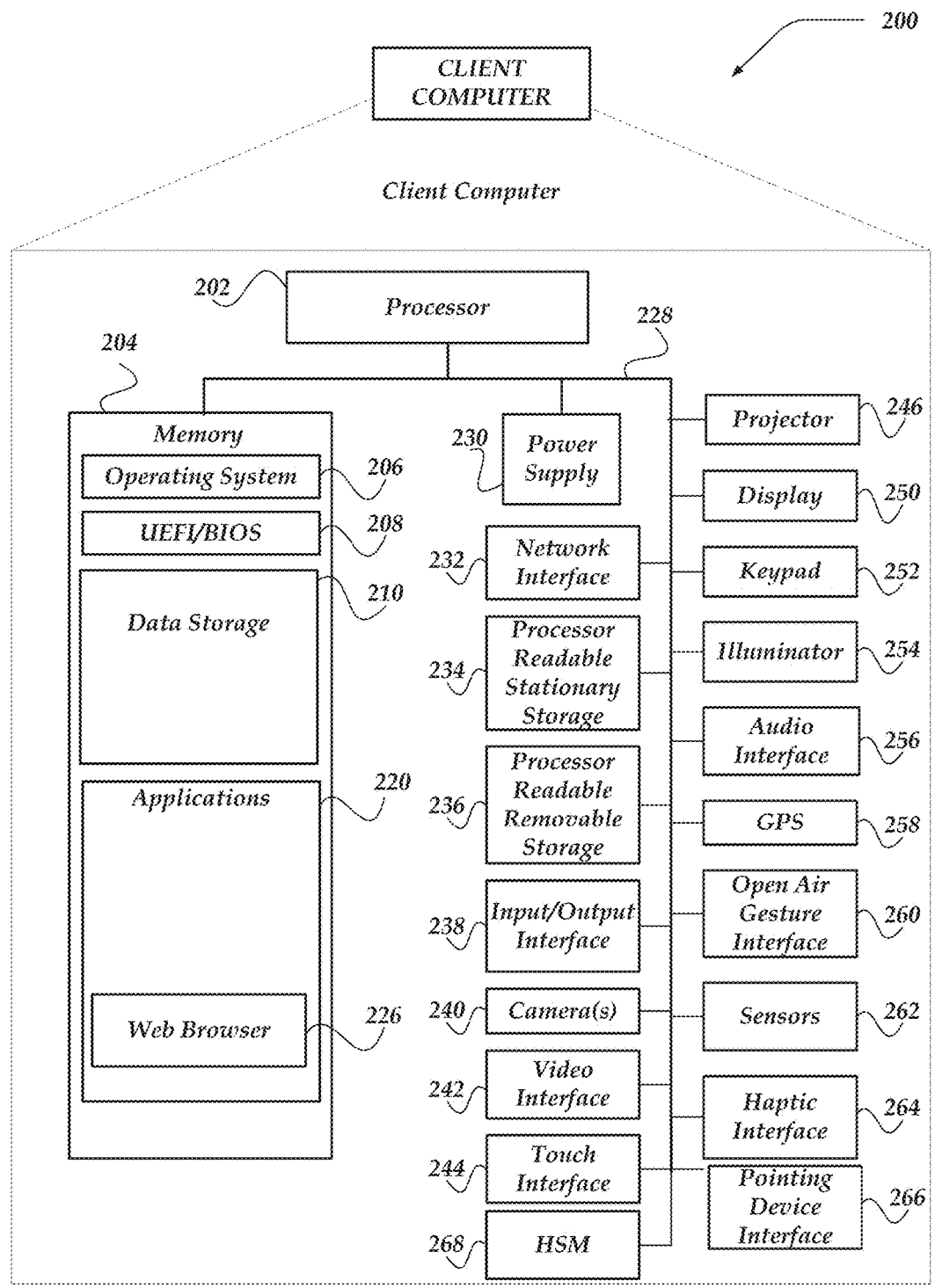
FIG. 2 shows an embodiment of a client computer that may be included in a system such as that shown in FIG. 1.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keypad 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store UEFI/BIOS 208 for controlling low-level operation of client computer 200. The memory may also store operating system 206 for controlling the operation of client computer 200. It will be appreciated that this component may include a general-purpose operating system such as a version of UNIX, or Linux, or a specialized client computer communication operating system such as Windows Phone, Android Operating System, or Apple's iOS operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer. Applications 220 may include computer executable instructions which, when executed by client computer 200, transmit, receive, and/or otherwise process instructions and data, such as, communicating name service requests to DNSMC 109 and/or receive name service responses from DNSMC 109.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

In at least one of the various embodiments, applications, such as, web server 226, other applications, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 258. Also, in some embodiments, geolocation information may include information providing using one or more geo-location protocols over the networks, such as, wireless network 108 and/or network 111.

Additionally, in one or more embodiments (not shown in the figures), client computer 200 may include an embedded logic hardware device instead of a CPU or as an adjunct to a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
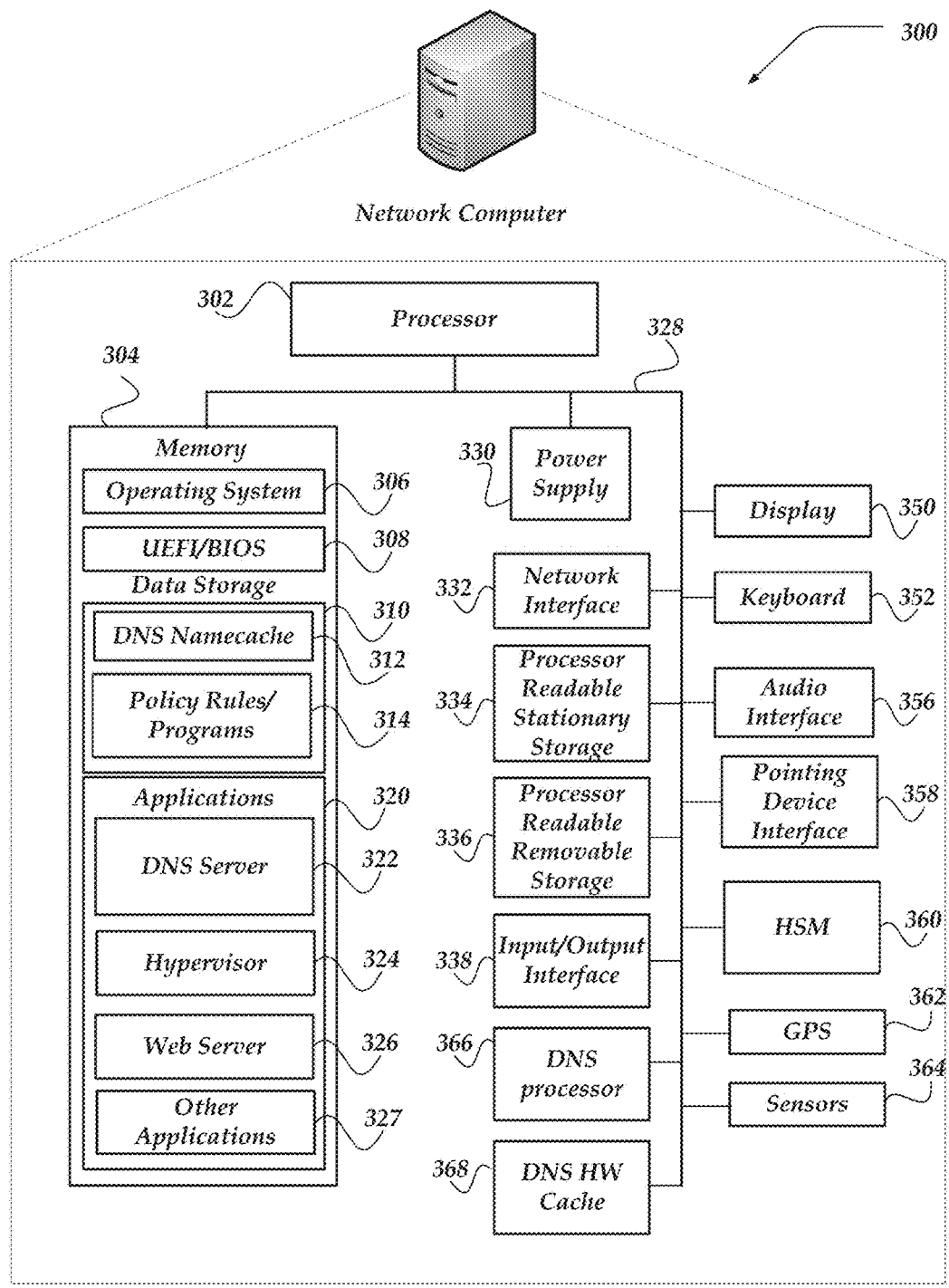
FIG. 3 shows an embodiment of a network computer that may be included in a system such as that shown in FIG. 1.

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of domain name system management computer (DNSMC) 107 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components may be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), non-transitory, and/or other types of memory. Memory 304 illustrates an example of computer-readable storage media (devices) for storage of information such as computer-readable instructions, data structures, program modules or other data. Memory 304 stores a unified extensible firmware interface and/or basic input/output system and/or (UEFI/BIOS) 308 for controlling low-level operations of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, DNS name cache 312, policy rules/programs 314, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include DNS server application 322, hypervisor 324, web server application 326, other applications 327, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, DNS server application 322, hypervisor 324, web server application 326, other applications 327, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 362. Also, in some embodiments, geolocation information may include information providing using one or more geo-location protocols over the networks, such as, wireless network 108 and/or network 111.

Furthermore, in at least one of the various embodiments, DNS server application 322 may be operative in a cloud-based computing environment. In at least one of the various embodiments, these applications, and others, that comprise the management platform may be executing within virtual machines and/or virtual servers that may be managed in a cloud-based based computing environment. Also, in at least one of the various embodiments, DNS server application 322, or the like, may located in virtual servers running in a cloud-based computing environment rather than being tied to one or more specific physical network computers.

Also, in at least one of the various embodiments, DNS server application 322 may be running in one or more virtual machines (VM's) executing on network computer 300. In at least one of the various embodiments, virtual machines running on network computer 300 may be managed and/or supervised by hypervisor 324.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include one or more embedded logic hardware devices instead of one or more CPUs, such as, Application Specific Integrated Circuits (ASICs), Field Programmable Gate Arrays (FPGAs), Programmable Array Logic chips (PALs), or the like, or combination thereof. The embedded logic hardware devices may directly execute embedded logic to perform actions. Also, in one or more embodiments (not shown in the figures), the network computer may include one or more hardware microcontrollers instead of one or more CPUs. In at least one embodiment, the one or more microcontrollers may directly execute their own embedded logic to perform actions and access their own internal memory and their own external Input and Output Interfaces (e.g., hardware pins and/or wireless transceivers) to perform actions, such as Systems On a Chip (SOCs), or the like.

Illustrative Logical System Architecture

Figure 4:
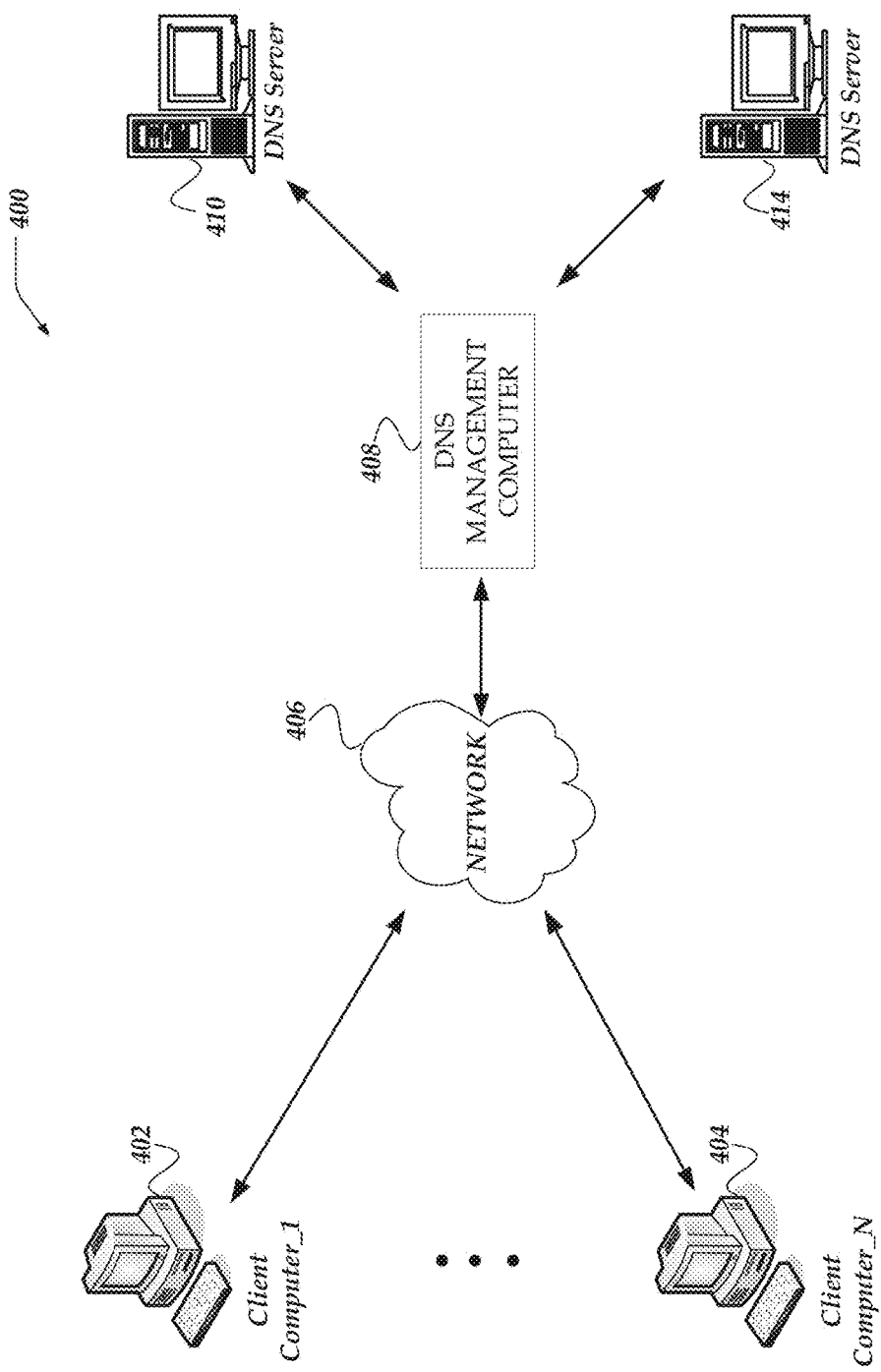
FIG. 4 illustrates a portion of a system for collaborative hardware and software DNS acceleration and DDOS protection in accordance with at least one of the embodiments.

FIG. 4 illustrates a portion of system 400 for collaborative hardware and software DNS acceleration and distributed denial of service (DDOS) protection in accordance with at least one of the embodiments. In at least one of the various embodiments, one or more client computers, such as, client computer 402, client computer 404, or the like, may be performing communication over a network through network 406. In at least one of the various embodiments, Network 406 may be, a network, such as, wireless network 107, network 108, or the like. Network 406 may be in communication with DNSMC 408. In at least one of the various embodiments, DNSMC 408 may be in communication with one or more server computers, such as, DNS server computer 410, and DNS server computer 414.

In at least one of the various embodiments, client computers 402-404 may be arranged to communicate name server requests over network 406 to DNSMC 408. Accordingly, in at least one of the various embodiments, DNSMC 408 may be arranged to respond to the provided requests. In some cases, DNSMC 408 may communicate with another DNS server computer, such as, DNS server computer 410 or DNS server computer 414. Such communication may include requests for information that may be used to answer a request from a client computer. In some cases, the DNSMC 408 may request database updates from one or more DNS servers, such as DNS server computer 410 and/or DNS server computer 412.

Note, client computers may include any type of computer that needs to name service information, such as, client computers, network computers, mobile computers, virtual machines (including cloud-based computers), or the like. Likewise, in production environments there may be more or fewer DNS server computers and/or client computers as depicted here in FIG. 4.

Figure 5:
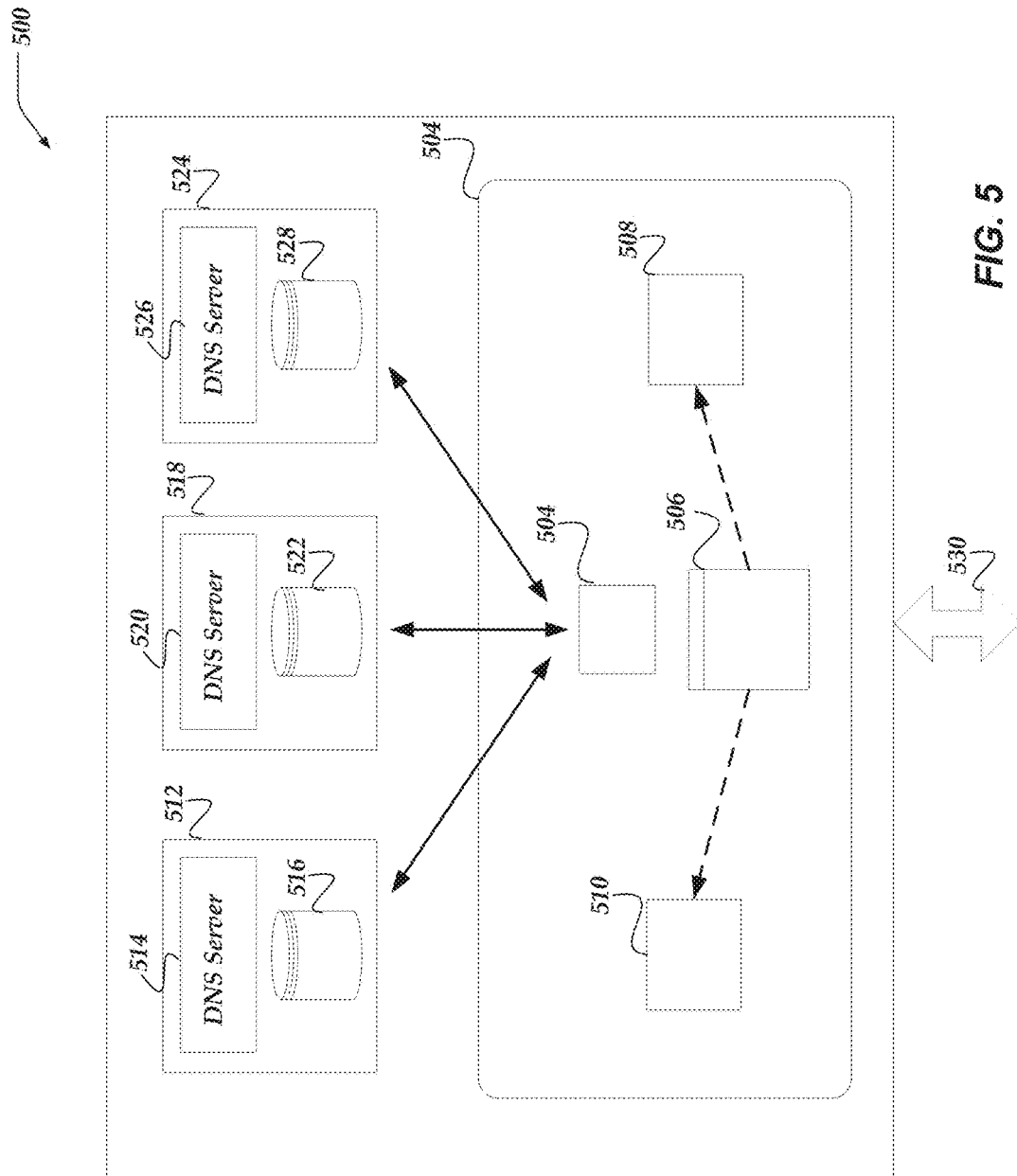
FIG. 5 illustrates a logical schematic of a DNSMC in accordance with at least one of the various embodiments.

FIG. 5 illustrates a logical schematic of DNSMC 500 in accordance with at least one of the various embodiments. In at least one of the various embodiments, DNSMC 500 may be comprised of several components such as: hardware DNS processor 504, one or more software DNS processors that may be hosted in one or more virtual machines (e.g., software DNS processor 512, software DNS processor 518, software DNS processor 524), or the like. In at least one of the various embodiments, each software DNS processor may include one or more DNS servers (e.g., DNS server 514, DNS server 520, and DNS server 526), each with their one local name service database/cache, such as, database 516, database 522, or database 528. Also, in at least one of the various embodiments, network path 530 may represent network communications with other networks, computers, DNS servers, or the like. Communication over network path 530 may be accomplished with one or more network interfaces, switches, routers, traffic management computers, or the like.

Further, in at least one of the various embodiments, DNS processor 504 may be comprised of various components, including hardware cache 504, DNS server list 506, one or more dedicated CPUs (e.g., CPU 508, and CPU 510). In at least one of the various embodiments, DNS processor may be an ASIC, FPGA, SoC, or the like, dedicated to accelerating DNS request/response handling.

Figure 6:
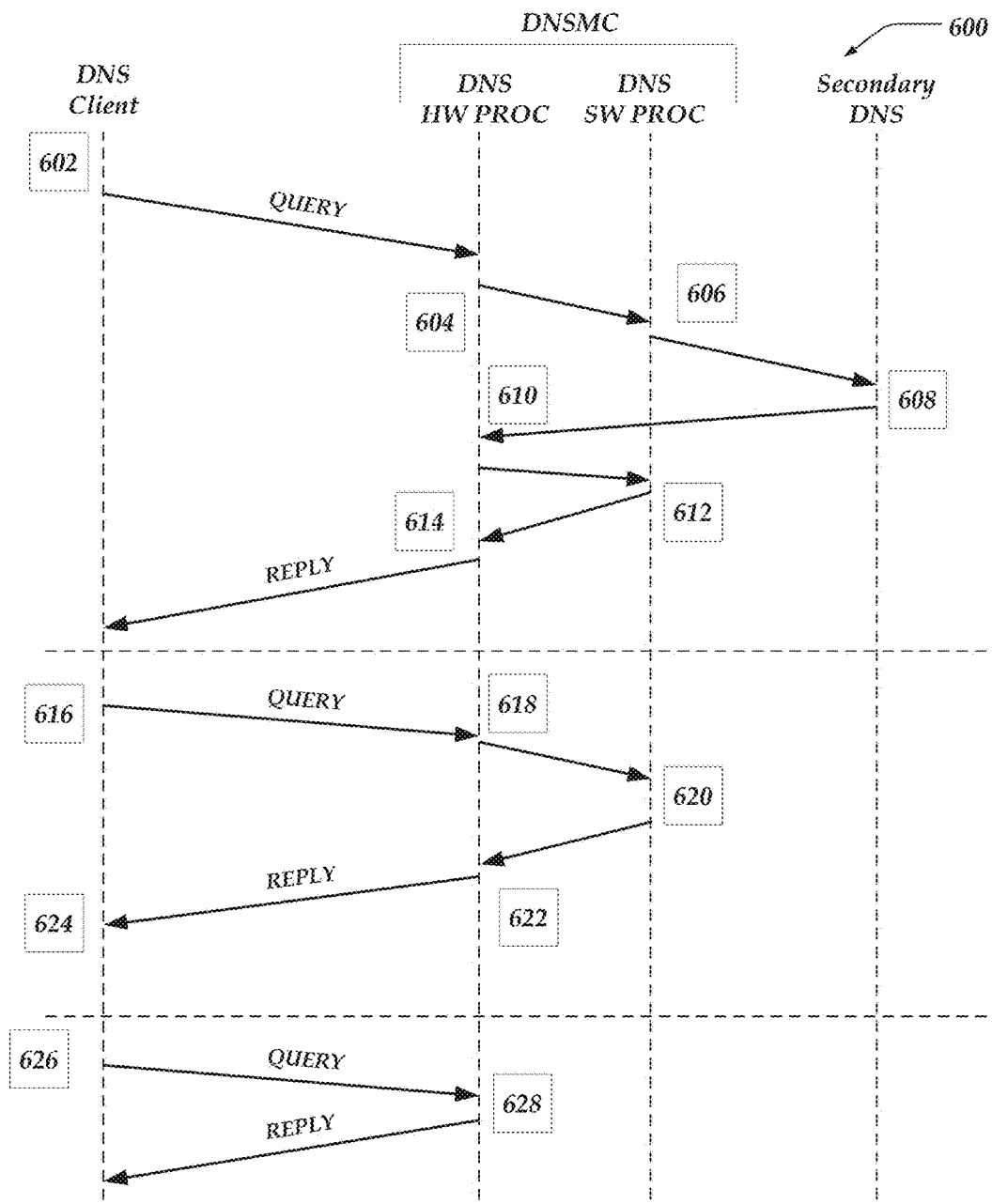
FIG. 6 illustrates a sequence diagram showing a sequence that includes sequences for processing name service requests in accordance with at least one of the various embodiments.

FIG. 6 illustrates a sequence diagram showing sequence 600 that includes sequences for processing name service requests in accordance with at least one of the various embodiments.

Steps 602-612 describe collaborative hardware/software DNS acceleration if a query may be resolved by forwarding it to another DNS server (recursive query). In this example, in at least one of the various embodiments, the DNSMC is unable to resolve the query directly and forwards it to another DNS server. Upon receiving the reply from the other DNS server, the DNSMC performs additional processing and provides a reply to the computer that sent the query.

At step 602, in at least one of the various embodiments, a query may be sent from a DNS client. In standard network configurations computers may be arranged to communicate various name service requests (queries) to a DNS server, or the like. Name service requests may include, address lookup queries (determining a network address from a computer hostname), reverse lookup queries (determining a computer hostname from a network address), and so on. In this example, DNS queries may be coming from computers that are configured to use a DNS management computer (DNSMC) for DNS services.

At step 604, in at least one of the various embodiments, the query may be received at a hardware DNS processor that is part of a DNS management computer. The hardware DNS processor may try to handle to the request. However, in this example, the hardware DNS processor is unable to answer/resolve the query. Accordingly, the query may be forwarded to a software DNS processor for further processing.

At step 606, in at least one of the various embodiments, the software DNS processor may attempt to resolve the query. However, in some cases, as shown in this example, the software DNS processor may be unable to resolve the request. Accordingly, in this example, the request may be communicated to an external DNS server.

At step 608, in at least one of the various embodiments, an external DNS server may receive the query that was forwarded from the DNSMC. The external DNS server may then resolve the request and communicate the appropriate response back to the DNSMC.

At step 610, in at least one of the various embodiments, the hardware DNS processor may receive the reply from the external DNS server. Accordingly, the hardware DNS processor may perform some initial protocol/message validation of the reply. Also, if the DNS is using a security protocol such as DNSSEC the hardware DNS process may be arranged to authenticate the reply using the protocol. After performing the initial validation/authentication of the reply sent by the external DNS server, the hardware DNS processor may forward the reply to the software DNS processor for further processing. Also, in at least one of the various embodiments, the hardware DNS processor may be arranged to send the reply to the client computer that made the query depending on the whether the reply is sufficiently trusted.

At step 612, in at least one of the various embodiments, the software DNS processor may obtain the reply from the hardware DNS processor. In at least one of the various embodiments, the software DNS processor may be arranged to perform some additional processing on the information provided by the external DNS server, such as, caching, additional validation/authentication, or the like. After, the software DNS processor may be finished processing the reply it may be passed back to the hardware DNS processor.

At step 614, in at least one of the various embodiments, the hardware DNS processor receives the reply. In at least one of the various embodiments, the hardware DNS processor may be arranged to perform various actions such as caching some or all of the information included in the reply. In at least one of the various embodiments, the hardware DNS processor may communicate the reply or a modified reply to the computer that provided the query.

Steps 616-624 describe collaborative hardware/software DNS acceleration if a query may be resolved by the DNSMC. In this example, in at least one of the various embodiments, the hardware DNS processor of the DNSMC is unable to resolve the query directly and forwards it a software DNS processor.

At step 616, in at least one of the various embodiments, a computer may communicate a name services (DNS) query to a DNSMC.

At step 618, in at least one of the various embodiments, the query may reach a hardware DNS processor of the DNSMC. In this example, the hardware DNS processor is unable to resolve the query. Accordingly, the query is provided to a software DNS processor of the DNSMC. In some cases, in at least one of the various embodiments, the hardware DNS processor may be configured to automatically forward some queries to the software DNS processor. In other cases, the hardware DNS processor may be configured to attempt to resolve the query and provide it to the software DNS processor upon failure.

At step 620, in at least one of the various embodiments, the query arrives at the software DNS processor. Accordingly, in at least one of the various embodiments, the query may be resolved by the software DNS processor and a reply may be generated and sent to the hardware DNS processor.

At step 622, in at least one of the various embodiments, the hardware DNS process may receive the reply and optionally perform various actions, such as, caching portions of the reply in its hardware cache. After performing these actions, if any, the hardware DNS processor may communicate the reply to the computer that initiated the query.

At step 624, in at least one of the various embodiments, the computer that sent the query may employ the reply as needed.

Steps 626-628 describe collaborative hardware/software DNS acceleration if a query may be resolved by the hardware DNS processor of the DNSMC. At step 626, in at least one of the various embodiments, a computer may generate a name service query and send it the DNSMC. At step 628, in at least one of the various embodiments, the hardware DNS processor, receives the query and is able to resolve it. Accordingly, in at least one of the various embodiments, the hardware DNS processor may generate a reply and send it to the computer that provided the query.

In at least one of the various embodiments, additional steps not shown in FIG. 6 may occur depending on the contents of the queries/replies, configuration rules, DNSMC workload, or the like, or combination thereof. For example, if the DNSMC determines the source of a query/reply is known to be malicious the query/reply may be dropped.

Figure 7:
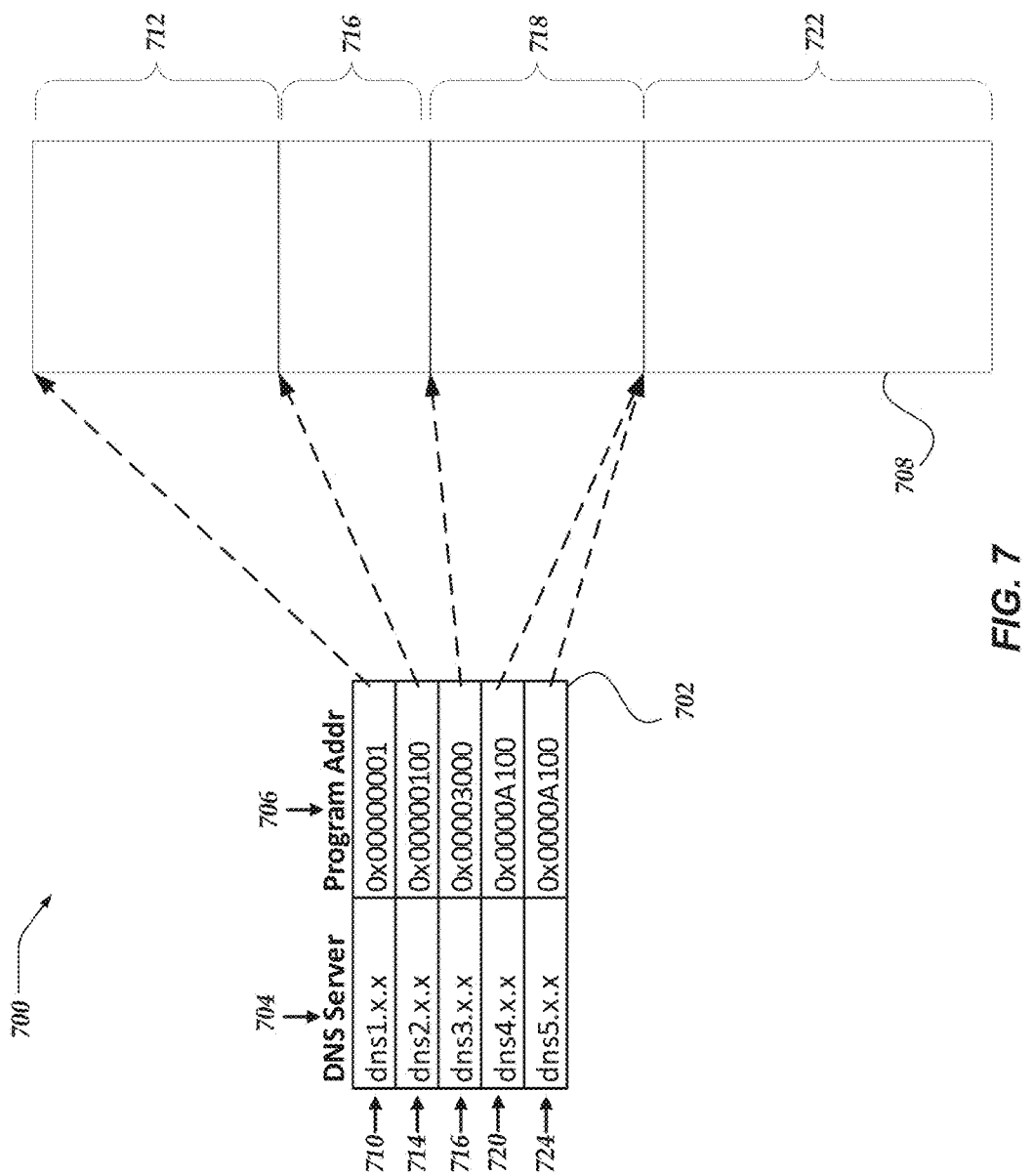
FIG. 7 illustrates a portion of a logical architecture for a hardware DNS processor that is in accordance with at least one of the various embodiments.

FIG. 7 illustrates a portion of a logical architecture for hardware DNS processor 700 that is in accordance with at least one of the various embodiments. As mentioned above, hardware DNS processors may be arranged to include a DNS servers list. See, list 506 in FIG. 5. In some embodiments, a DNS server list may be implemented as a hardware table or cache, such as, table 702. In at least one of the various embodiments, table may include column 704 that includes the name and/or identifier of a DNS server and column 706 that may include a memory address value.

In at least one of the various embodiments, the memory address values may point to a portion of memory in the hardware DNS processor, such as memory 708. In at least one of the various embodiments, memory 708 may be memory that is onboard the hardware DNS processor. In this or another embodiment the memory address value may point to a portion of memory in an associated processor, in which case the hardware DNS processor would access this other processor's memory as needed using direct memory access (DMA) techniques or the like and optionally cache it within the hardware DNS processor's memory. In some embodiments, memory 708 or other processor's memory may be arranged to include instructions that may be executable by the one or more onboard CPUs that may be part of hardware DNS processor 700. In at least one of the various embodiments, these instructions may be uploaded to hardware DNS processor 700 by one or more software DNS processors, or the like.

In at least one of the various embodiments, table 702 may include several DNS server identifiers. In some embodiments, the DNS servers may be servers that may be incorporated in a software DNS processor and shown in FIG. 5. In at least one of the various embodiments, table 702 may be arranged to identify one or more custom programs that may be associated with a DNS server. Accordingly, if communications (e.g. queries, replies, or the like) for a DNS server arrive at the hardware DNS processor, table 702 may be employed to identify a particular program of instructions that should be executed to process and/or apply policies to the incoming communications. In this example, line 710 shows if a message comes in for dns1.x.x.x it should be processed using the program instruction at memory location 0x00000001 illustrated by memory block 712. Likewise, in this example, line 714 shows that message for DNS server dns2.x.x.x should be processed using the program instructions at memory block 716. And, line 716 shows that message for DNS server dns3.x.x.x should be processed using the program instructions at memory block 718.

Also, in at least one of the various embodiments, more than one DNS server may use the same program instructions to process messages and/or apply policies. Accordingly, in this example, line 720 and line 724 show that DNS servers, dns4.x.x.x and dns5.x.x.x both use the same program instructions at memory block 722 for processing messages and/or applying policy.

Generalized Operations

FIGS. 8-13 represents the generalized operations for systems and methods for collaborative hardware and software DNS acceleration and DDOS protection in accordance with at least one of the various embodiments. In at least one of the various embodiments, processes 800, 900, 1000, 1100, 1200, and 1300 as described in FIGS. 8-13 may be implemented by and/or executed on a single DNS management computer (DNSMC) and/or network computer, such as network computer 300 of FIG. 3. In other embodiments, these processes or portions thereof may be implemented by and/or executed on a plurality of network computers, such as network computer 300 of FIG. 3, client computer 200 of FIG. 2, or the like. However, embodiments are not so limited, and various combinations of network computers, client computers, virtual machines, DNSMCs, or the like may be utilized. Further, in at least one of the various embodiments, the processes described in conjunction with FIGS. 8-13 may be operative in DNS management computers, systems, and/or architectures, such as, those described in conjunction with FIGS. 1-7.

Figure 8:
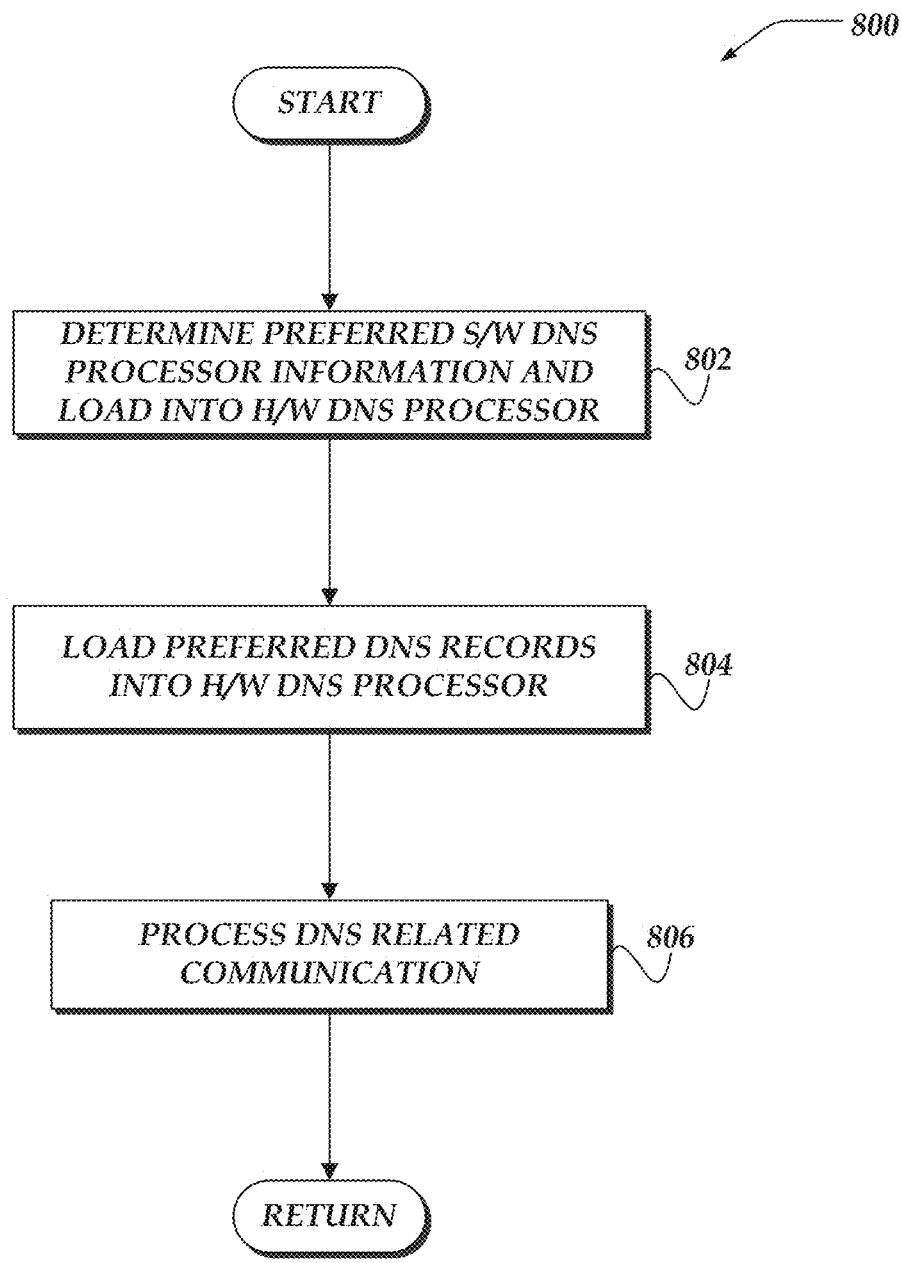
FIG. 8 illustrates an overview flowchart of a process for collaboration of hardware and software for DNS acceleration and defense against denial of service attacks, in accordance with at least one of the various embodiments.

FIG. 8 illustrates an overview flowchart of process 800 for collaboration of hardware and software for DNS acceleration and defense against denial of service attacks, in accordance with at least one of the various embodiments. After a start block, at block 802, information associated with the software DNS processors may be loaded into the hardware DNS processor. In at least one of the various embodiments, a DNSMC may include more than one software DNS processor. In some embodiments, the separate software DNS processors may be virtual machines managed by a hypervisor. As described above, each software DNS processor may include a DNS server, a DNS record cache, or the like. In at least one of the various embodiments, separate software DNS processors may provide name services for different applications/domains even though they may be running on the same DNSMC.

Accordingly, information may be loaded into the hardware DNS processor to configure how the software DNS processors may be used. For example, the configuration information may include a lookup table for routing DNS queries and replies to particular other hardware or software DNS processors.

At block 804, in at least one of the various embodiments, various DNS records may be loaded into the hardware DNS processor. In at least one of the various embodiments, these records may include information that may be used for replying to DNS queries, such as, DNS A records, NS Records, PTR Records, AAAA records, any other DNS record type, or the like. In other embodiments, the DNSMC may support other/additional name services in addition to DNS, such as, NETBIOS, or the like. Accordingly, preferred records may be loaded for those other services as well, if any.

In at least one of the various embodiments, some or all of the information loaded at block 804 may be stored in one or more high-speed caches that are part of the hardware DNS processor. For example, DNS records may be stored in a high-speed cache to accelerate the processing of particular/preferred DNS queries.

At block 806, in at least one of the various embodiments, if configured, the DNSMC may begin processing DNS related communication. As described above, the DNSMC may receive and resolve DNS queries from clients, DNS replies from external DNS servers, send DNS replies to clients, or the like. Next, control may be returned to a calling process.

Figure 9:
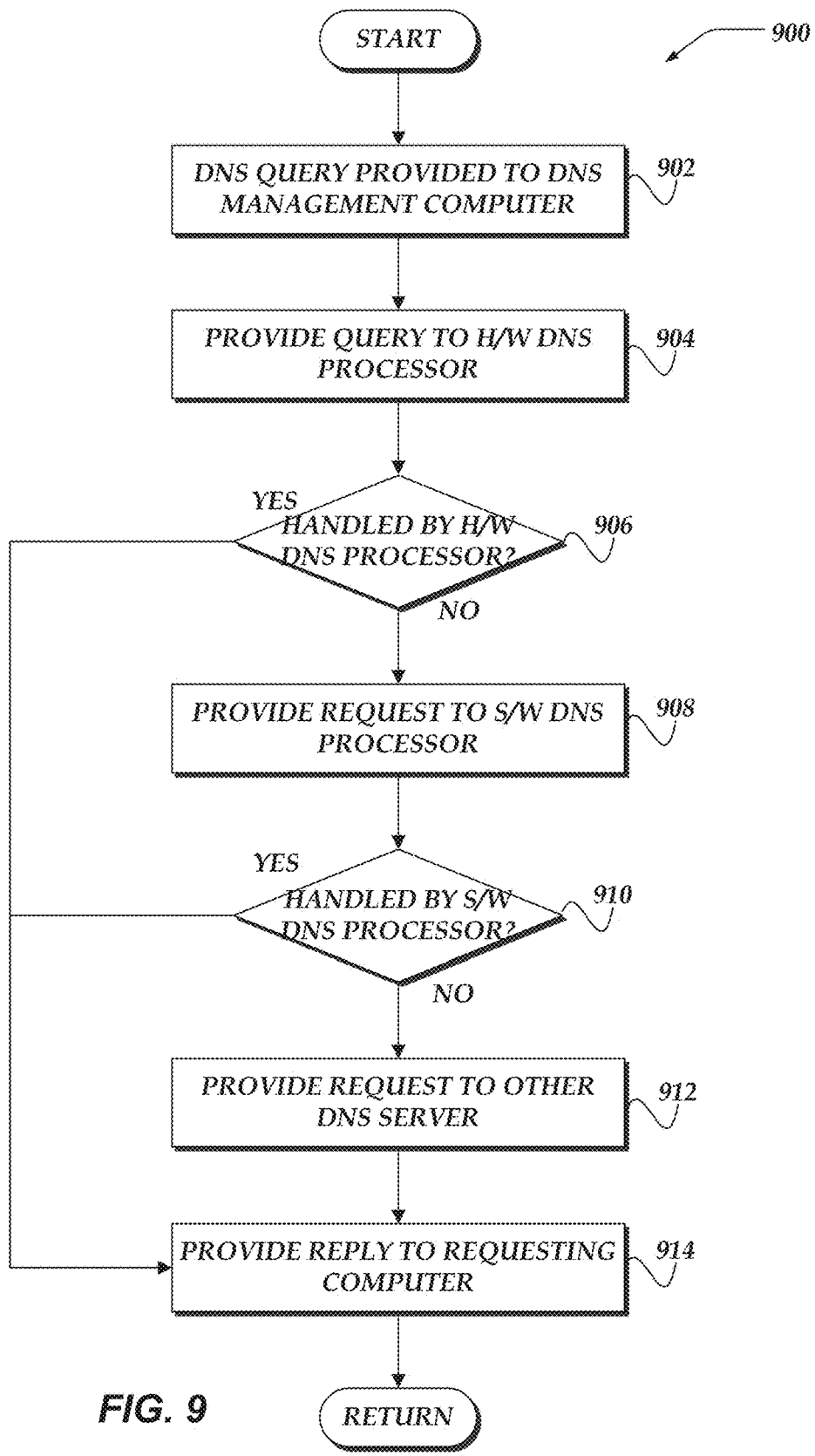
FIG. 9 illustrates and overview flowchart for a process for collaboration of hardware and software for DNS acceleration and defense against denial of service attacks, in accordance with at least one of the various embodiments.

FIG. 9 illustrates an overview flowchart for process 900 for collaboration of hardware and software for DNS acceleration and defense against denial of service attacks, in accordance with at least one of the various embodiments. After a start block, at block 902, in at least one of the various embodiments, a DNS query may be provided to the DNSMC. In at least one of the various embodiments, DNS queries may be specially formatted network messages that computers (e.g., DNS clients) send when they need to request information from the name service. For example, a client may provide a DNS query that asks for the network address for a particular hostname. In these examples, the client may have access to the hostname (e.g., mail.foo.bar) of a computer and/or application. Accordingly, in this example, the DNS query is asking the DNSMC for the network address that is associated with the hostname mail.foo.bar. In some embodiments, other types of queries may be provided using the DNS protocol or one or more other name service protocols.

At block 904, in at least one of the various embodiments, the query may be provided to the hardware DNS processor. In at least one of the various embodiments, the DNSMC may be arranged so that all incoming queries are first provided to the hardware DNS processor. This enables the high-performance hardware an opportunity to first process the query.

At decision block 906, in at least one of the various embodiments, if the query may be completely handled at the hardware DNS processor, control may flow to block 914; otherwise control may flow to block 908. In at least one of the various embodiments, depending on the query, the hardware DNS processor may be able to completely resolve the request. In at least one of the various embodiments, resolving the request may include discarding if it fails validation/authentication, or if it is otherwise determined to be malicious.

In at least one of the various embodiments, the hardware DNS processor may be loaded with lookup tables, bit masks, configuration rules, programs/scripts, or the like, that may be employed to inspect the contents of the queries to determine if it is to continue processing or to discard the query.

In at least one of the various embodiments, the hardware DNS processor may be arranged to directly answer the query if it can be answered from its cache of DNS records. In other cases, the hardware DNS processor may provide the request to another CPU, microcontroller, or processor to perform additional processing, such as, validating the request or query.

At block 908, in at least one of the various embodiments, if the hardware DNS processor is unable to completely process the query it may forward the query to a determined software DNS processor. In at least one of the various embodiments, the hardware DNS processor may select the particular software DNS processor based on the content of the message and/or the configuration information that is loaded in the hardware DNS processor. For example, a lookup table stored in a high-speed cache of the hardware DNS processor may be used to determine the software DNS processor to select based on the information such as, the source of the query, the question being asked (e.g., a hostname that needs to be looked up), or the like. In some embodiments, selecting a software DNS processor may be based on one or more network/resource management policies, such as, load balancing, or the like. In some embodiments, the applicable policies may employ some or all of the query content to drive the selection of a software DNS processor. (See, FIG. 12 for more detail.)

Further, in at least one of the various embodiments, the hardware DNS processor may be arranged to provide hints and/or other meta-data information to the software DNS processor along with the query information.

At decision block 910, in at least one of the various embodiments, if the query is handled by the software DNS processor, control may flow to block 914; otherwise, control may flow to block 912. In at least one of the various embodiments, the software DNS processor includes a DNS server that may attempt to resolve the query. In some embodiments, the software DNS processor may be arranged to perform one or more actions to validate and/or authenticate the query. Accordingly, if the software DNS processor is unable to answer the query it may forward the query to one or more external DNS servers.

At block 912, in at least one of the various embodiments, the query may be provided to an external DNS server to obtain an answer. In at least one of the various embodiments, the information for the query may not be stored locally at the DNSMC so the query may be forwarded to another DNS server that has the necessary information. In some cases, the original query may include a flag or other indicator that determines if the query may be forwarded to an external DNS server (e.g. recursive lookup).

In at least one of the various embodiments, responses and/or replies from the external DNS server may be received at the hardware DNS processor so they may be validated and/or authenticated. In at least one of the various embodiments, this validation step at the hardware DNS processor may be employed to reduce the impact of denial of service attacks, cache poisoning attacks, or the like.

At block 914, in at least one of the various embodiments, the DNSMC may provide the reply (if any) to the client that submitted the request. In at least one of the various embodiments, if the query is determined to be valid and the reply is also valid, the hardware DNS processor may be arranged to cache the response information in a high-speed hardware cache. Accordingly, if a valid query for the same or related information is received, it may be answered using the values in the high-speed cache. Next, control may be returned to a calling process.

Figure 10:
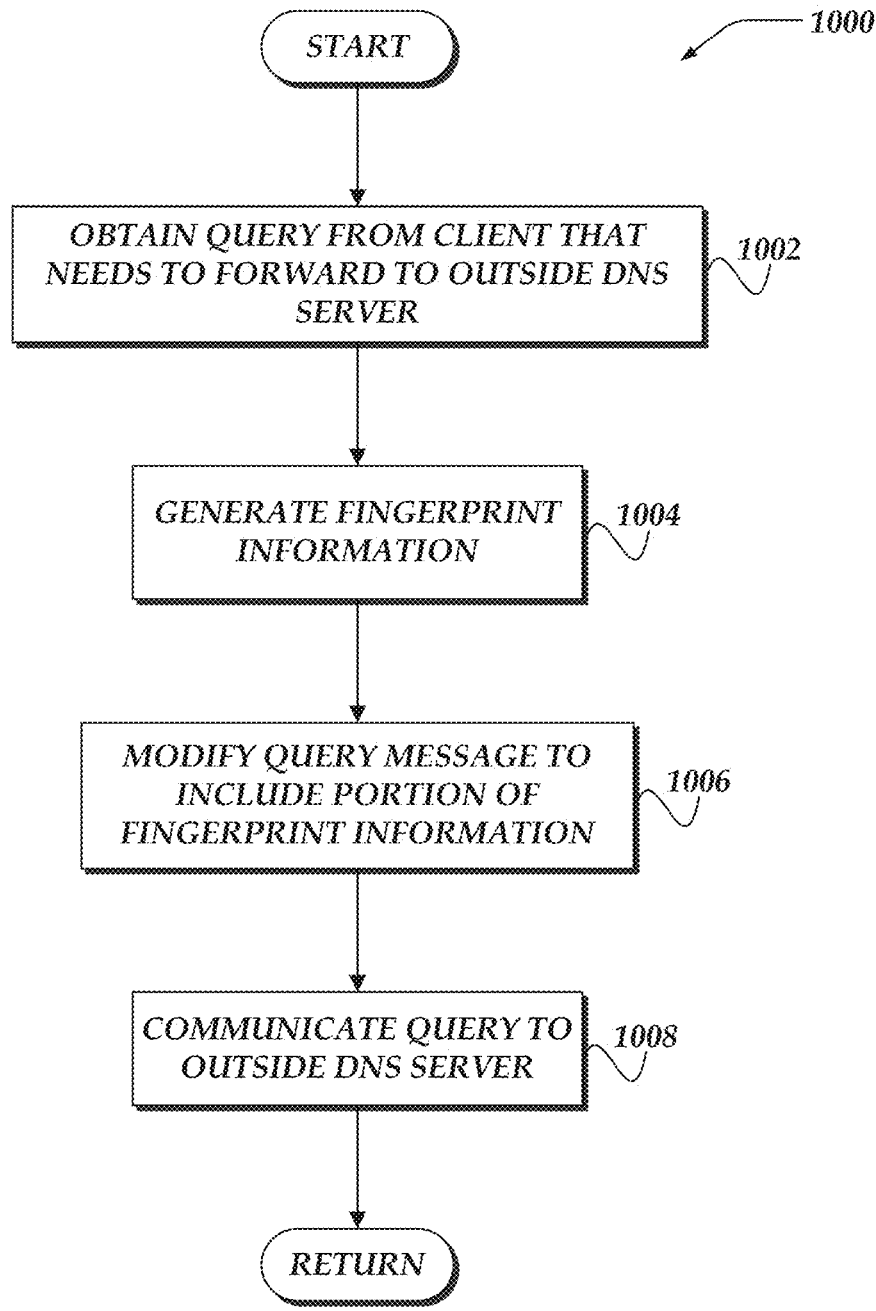
FIG. 10 illustrates an overview flowchart of a process for communicating queries to outside DNS servers in accordance with at least one of the various embodiments.

FIG. 10 illustrates an overview flowchart of process 1000 for communicating queries to outside DNS servers in accordance with at least one of the various embodiments. After a start block, at block 1002, in at least one of the various embodiments, a query may be obtained from a client that requires forwarding to an outside DNS server. As discussed above, name service protocols, such as, the DNS protocol may allow for recursive queries where a first DNS server may forward a query to another DNS server if the first DNS server is unable to resolve the query itself. However, in at least one of the various embodiments, before forwarding the query, the message may be processed to help ensure that the response reply is valid.

At block 1004, in at least one of the various embodiments, the DNSMC may generate fingerprint information from the content of the query. In at least one of the various embodiments, the fingerprint information may be arranged such that it includes a secret value (e.g., a random bit string, or the like). Further, since the protocol used by the name server, the DNS protocol, may be a well-known protocol, one or more known fields of the query may be employed to make the fingerprint information. For example, the fingerprint information may be created by applying one or more algorithms, such as a hash-based algorithm.

At block 1006, in at least one of the various embodiments, the query may be modified to include at least a portion of the fingerprint information. In at least one of the various embodiments, the information included in the modified query may be used as an index value to lookup the fingerprint information that may be generated at block 904. For example, assuming DNS protocol is used, a portion of the fingerprint information may be incorporated into an index value that may be put in the 16-bit query ID field of the message. Alternatively, in at least one of the various embodiments, a hash or hash decimation algorithm may be applied to the fingerprint information to generate such an index.

Also, in some embodiments, a random string may be generated and included in a field of the message that is guaranteed by the protocol to be return unmodified from the destination server. Further, in at least one of the various embodiments, the field may be expected to be modified by agreement with the destination server in such a way that when it is returned the modification is reversed, again employing the agreed mechanism, to verify the query and response were not modified by some intermediate party.

At block 1008, in at least one of the various embodiments, the modified query may be communicated over a network to the outside DNS server. In at least one of the various embodiments, since the protocol of the name service is static the modifications to the query (e.g., the fingerprint information and/or the fingerprint index and/or marker values) must remain consistent with the underlying protocol being used. Next, control may be returned to a calling process.

Figure 11:
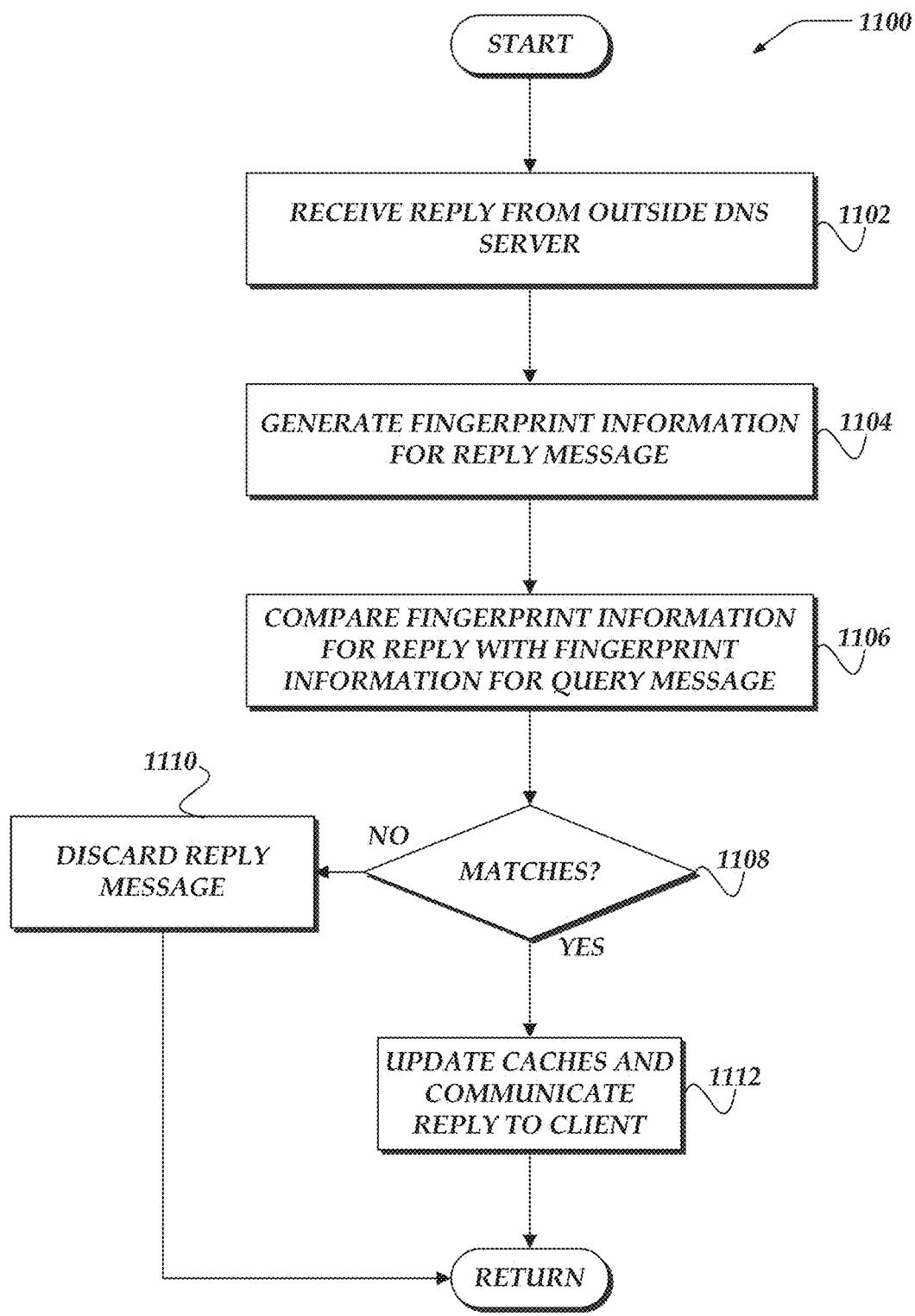
FIG. 11 illustrates an overview flowchart of a process for handling replies communicated by outside DNS servers in accordance with at least one of the various embodiments.

FIG. 11 illustrates an overview flowchart of process 1100 for handling replies communicated by outside DNS servers in accordance with at least one of the various embodiments. After a start block, at block 1102, in at least one of the various embodiments, a reply may be received from outside DNS server. As mentioned, in at least one of the various embodiments, queries that are not handled by a hardware DNS processor or a software DNS processor may be forwarded to one or more external DNS servers. In at least one of the various embodiments, to protect against malicious attacks, such as, attempts to introduce false/malicious information into a name service cache (cache poisoning), the reply may be validated to help ensure that it is provided from a legitimate responder, namely, that the reply originated from the same DNS server it was sent to.

At block 1104, in at least one of the various embodiments, fingerprint information may be generated for validating the reply. In at least one of the various embodiments, the reply may include some of the same fields and/or field value that were included in the query that was forwarded. The particular fields and values used for the fingerprint information may depend on the name service protocol and/or the network protocol that is used.

In at least one of the various embodiments, generally, the same fields and algorithms used to make the fingerprint information from the query may be used to make the fingerprint information for the reply. In some cases, certain fields may be inverted, modified, or swapped to account for variations in the protocol for queries versus replies. For example, if the source address and destination address are used to make the fingerprint when sending a query to an outside server, they may be swapped to make the fingerprint information from the reply message. For example, assuming DNS protocol packet format, if the fingerprint information made from a query message is a hash made from the "source address:destination address:ID field". Then the fingerprint information made for the replies should be "destination address:source address:ID field".

At block 1106, in at least one of the various embodiments, the fingerprint information generated from the reply may be compared with the fingerprint information that was generated from the query.

At decision block 1108, in at least one of the various embodiments, if the fingerprint information generated from the reply matches the fingerprint information generated from the query, control may flow to block 1112; otherwise, control may flow to block 1110. In at least one of the various embodiments, the fingerprint information created from the query may be stored accordingly, and it may be used to confirm the reply is valid.

At block 1110, in at least one of the various embodiments, since the reply does not look like it is associated with a query that was sent by the DNSMC, the message may be discarded. In at least one of the various embodiments, further actions may be taken such as adding the source address of the unmatched reply to a watch list and/or blacklist, counting such occurrences in various ways, generating log entries or other system management notations, or the like.

At block 1112, in at least one of the various embodiments, since the reply is authenticated, the response may be considered valid. Accordingly, one or more caches for the software DNS processor and the hardware DNS processor may be updated and the reply may be communicated to the client that sent the corresponding query. Also, the software DNS process may be arranged to communicate a status message to the hardware DNS processor to indicate that the reply is valid. Next, control may be return to a calling process.

Figure 12:
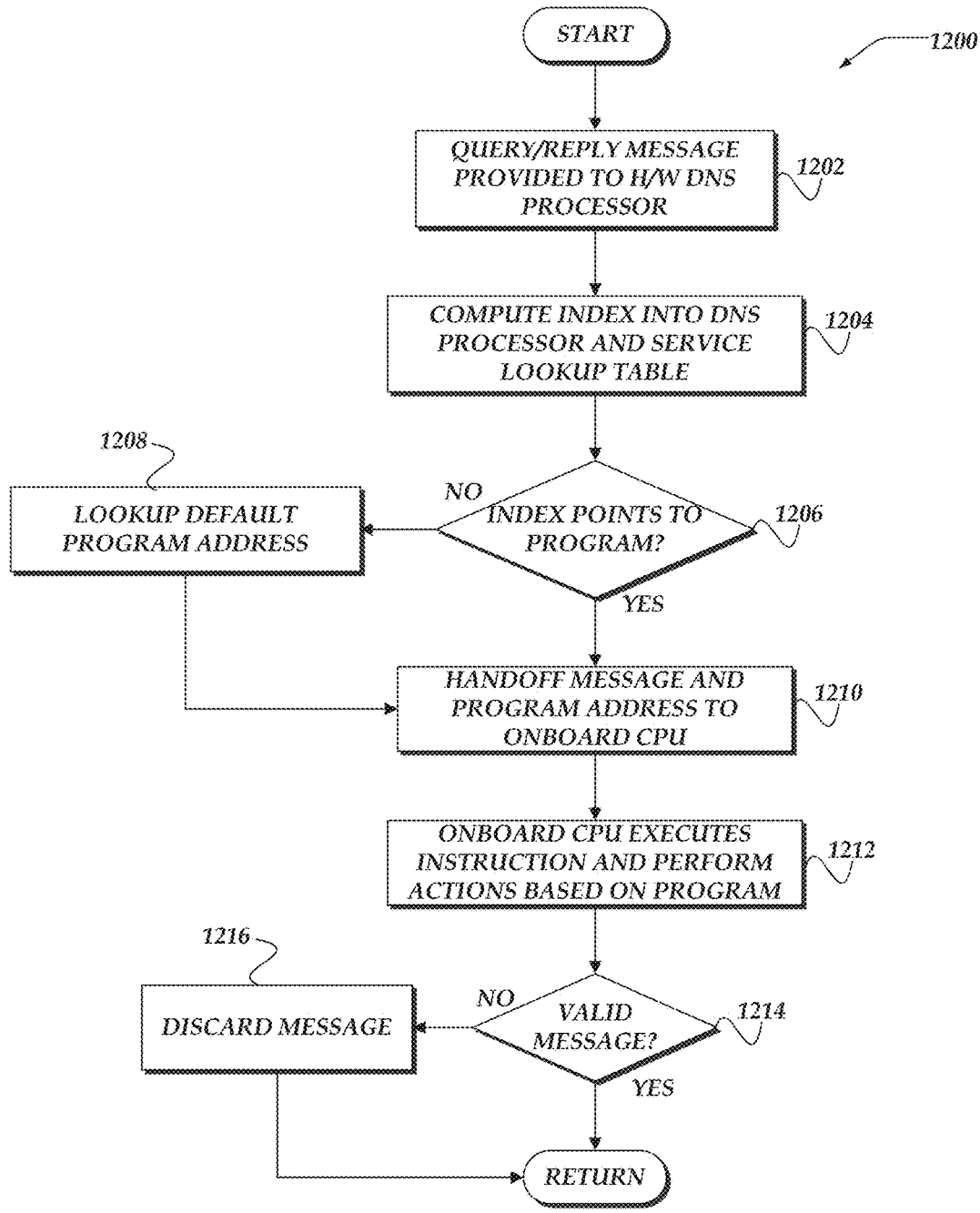
FIG. 12 illustrates an overview flowchart of a process for handling messages at a hardware DNS processor in accordance with at least one of the various embodiments.

FIG. 12 illustrates an overview flowchart of process 1200 for handling messages at a hardware DNS processor in accordance with at least one of the various embodiments. After a start block, at block 1202, in at least one of the various embodiments, one or more messages, such as, queries and/or replies may be provided to a hardware DNS processor. As discussed above, the hardware DNS processor may be provided various name service related messages, including DNS queries and DNS replies.

At block 1204, in at least one of the various embodiments, an index into the DNS processor and service lookup table of the hardware DNS processor may be generated and/or provided. In at least one of the various embodiments, the hardware DNS processor may be arranged to determine an index value that may be used to lookup a DNS server in a DNS server lookup table. In some embodiments, the provided message may include one or more fields that may be used for deriving the index value. For example, the message may include various fields, such as, source, destination, query information, or the like. Accordingly, in at least one of the various embodiments, the hardware DNS processor may be arranged to perform actions, such as, hashing, masking, comparisons, or the like, or combination thereof, based one or more portions of the provided message.

For example, in at least one of the various embodiments, portions of the provided message may include a source network address, such as an IP address. In some embodiments, bit masks may be defined to identify source computers (clients) from their network addresses so they may be routed to a particular record in the lookup table. Also, in at least one of the various embodiments, other pattern matching techniques may be used to select the index value that may be used for looking up an entry in the lookup table.

In at least one of the various embodiments, the DNS servers may be load balanced. Accordingly, in at least one of the various embodiments, the index may be selected using a load balancing algorithm, including round-robin selection.

At decision block 1206, in at least one of the various embodiments, if the index points to an address or reference to a program, control may flow to block 1210; otherwise, control may flow to block 1208. In at least one of the various embodiments, the lookup table may be arranged to include a reference, pointer, or memory address, or the like that is associated with the onboard program instructions associated with a selected DNS server, or with program instructions that may be retrieved from another processor's memory using direct memory access (DMA) techniques and optionally cached within the hardware DNS processor's memory. In some cases, the DNS server may not be associated with a custom/dedicated program or in other cases, the DNS server may not be in the lookup table. For example, the lookup table may be a limited resource, accordingly, not every DNS server may be included.

At block 1208, in at least one of the various embodiments, a default program may be selected. In at least one of the various embodiments, the hardware DNS process may be arranged to selected a default reference, pointer, or memory address, or the like that is associated with the onboard program instructions the may selected as a default or fallback.

At block 1210, in at least one of the various embodiments, the incoming message and the address or pointer of the selected program may be provided to one of the CPUs (or microcontrollers) that may be onboard the hardware DNS processor. In at least one of the various embodiments, as described above the hardware DNS processor may include one or more CPU or microcontrollers that are embedded directly in the hardware DNS processor. For example, in at least one of the various embodiments, the hardware DNS processors may be an ASIC or FPGA that includes one or more onboard CPU/microcontrollers.

At block 1212, in at least one of the various embodiments, the onboard CPU/microcontroller executes one or more instructions included in the program and performs actions based on the message. In at least one of the various embodiments, the program may include various methods for validating the provided message. In some embodiments, the program may be arranged to implement one or more network management/application control policies that are associated with the selected DNS server. For example, the program may include instructions for applying policies, such as, blacklists, whitelists, pattern matching, conditions, or the like, that may be used to determine the validity of the provided message.

In some embodiments, the CPU/microcontroller may perform deep packet inspection of the message to identify patterns that determine how to processes the message. Also, the program may be arranged to use any layer of the communication and/or network protocol when applying policies. For example, since DNS messages may use the UDP protocol, the OSI layer 4 UDP header fields/information may be available to use for determining policy for the DNS messages. Likewise, in some embodiments, OSI layer 3 information, such as, IP, ARP, IPSec, or the like, may be also be used to apply policies.

In at least one of the various embodiments, since the program instructions are executed by a CPU/microcontroller they may be uploaded to the hardware DNS processor from a software DNS processor and/or an administrative process. Accordingly, since a lookup table may be employed to select different programs depending on the DNS server selection, some or all of the DNS servers (including those that are part of software DNS processors) may use customized polices rules that may execute on the hardware DNS processor.

In at least one of the various embodiments, the hardware DNS processor may provide one or more "hints" or meta-data that may be used by the software DNS processor. In at least one of the various embodiments, the hardware DNS processor may perform pre-processing operations that are much faster to perform on the specialized hardware of the hardware DNS processor rather than performing on the software DNS processor. For example, in some embodiments, as discussed above, portions of the provided message may be hashed together to create a fingerprint value that be used to correlate legitimate queries with replies from external DNS servers. Accordingly, this hashing may be performed on the hardware DNS processor rather than the software DNS processor.

Also, in at least one of the various embodiments, the hardware DNS processor may be arranged to perform one or more cryptographic operations before the message may be provided to another component, such as, a software DNS processor and a meta-data hint would be provided to the software DNS processor to indicate it need not perform such checks.

At decision block 1214, in at least one of the various embodiments, if the provided message is invalid, control may flow to block 1216; otherwise, control may be returned to a calling process.

In at least one of the various embodiments, if the hardware DNS processor and the selected program instructions validate the provided message, it may be provided to another component or computer. In some cases, such as, replies from external DNS servers, the message may be forwarded to a computer that provided the corresponding queries. Also, in at least one of the various embodiments, if the message is a query, the hardware DNS processor may forward the message to the software DNS processor determined from the lookup table.

At block 1216, in at least one of the various embodiments, since the execution of the program instructions determined that the provided message is invalid, the message may be discarded. Next, control may be returned to a calling process.

Figure 13:
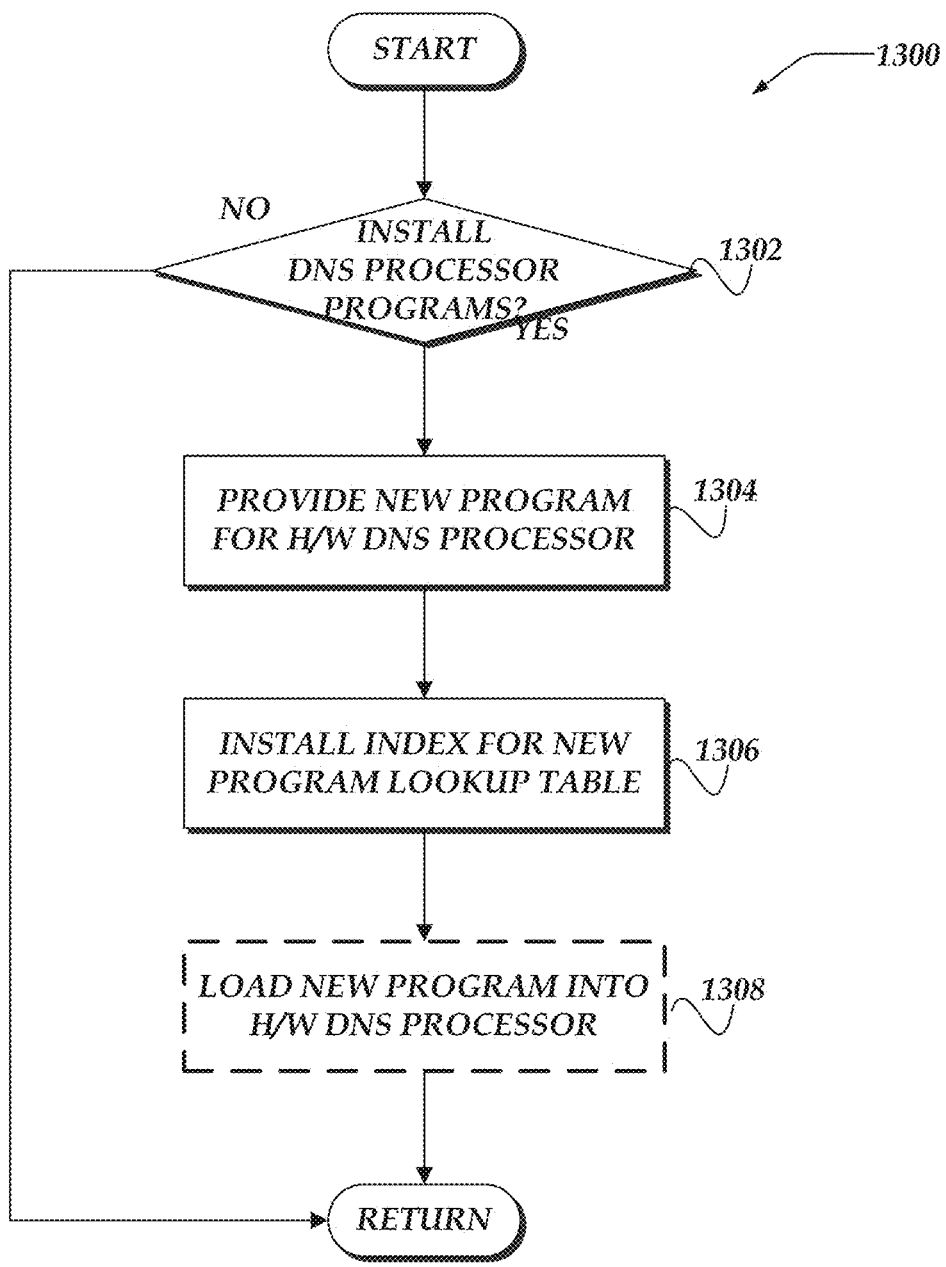
FIG. 13 illustrates a flowchart of a process for installing programs for a hardware DNS processor in accordance with at least one of the various embodiments.

FIG. 13 illustrates a flowchart of process 1300 for installing programs for a hardware DNS processor in accordance with at least one of the various embodiments. After a start block, at decision block 1302, in at least one of the various embodiments, if DNS processor programs should be installed, control may flow to block 1304; otherwise, control may be returned to a calling processor. In one or more of the various embodiments, various conditions may occur that may trigger the installation of one or more different DNS processor programs. In one or more of the various embodiments, the conditions for installing a program may be defined by one or more policy rules or configuration information.

Also, in some embodiments, there may be more DNS programs available than may fit into the lookup table index. Accordingly, in one or more of the various embodiments, one or more policy rules may be arranged to load programs if certain conditions may be met. For example, in one or more of the various embodiments, policy rules may be configured to load particular DNS processor programs and add their index into the lookup table.

Further, in one or more of the various embodiments, a user or administrator may manually (via a user-interface or by setting configuration information) trigger a DNS program to be loaded. For example, a user may provide a new program that may be arranged to recognize new DNS denial of service signatures, malignant traffic patterns, or the like.

At block 1304, in one or more of the various embodiments, one or more new DNS processor programs may be provided. In one or more of the various embodiments, one or more new programs may be loaded from a storage pool, removable media, or the like. In some embodiments, the new program may be installed in memory that is accessible from by H/W processor. In some embodiments, if needed, another program may be displaced. In one or more of the various embodiments, the displaced program may be selected manually. Or, in some embodiments, it may be selected based on a rank score computed based on, the number of uses in a defined time window, assigned importance/priority scores, time since last use, or the like. In one or more of the various embodiments, configuration information or policy rules may be arranged to assign the relevant rank values to DNS processor programs.

At block 1306, in one or more of the various embodiments, an index for the one or more new DNS processor programs may be installed into the lookup table. In some embodiments, new index values may be used or in some cases existing index values may be overwritten or replaced. In one or more of the various embodiments, as soon as the index value is available in the program lookup table, the program may be available for use by a H/W DNS processor.

At block 1308, in one or more of the various embodiments, optionally, the new DNS processor program may be loaded and executed immediately by a H/W DNS processor. In one or more of the various embodiments, the new program may be required to mitigate an on-going DNS attack. Accordingly, in some embodiments, it may be executed immediately after being installed.

Next, control may be returned to a calling process.

It will be understood that each block of the flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, one or more steps or blocks may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform some or all of the actions in one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for managing name service communications, executable by one or more name service devices with at least one processor executing the method, the method comprising actions to:
   receive, by a hardware domain name service (DNS) processor on one or more name service devices, a name service query from one or more requesting computers;
   perform, by the hardware DNS processor on the one or more name service devices, one or more operations on the name service query;
   when, the name service query is unresolved by the one or more operations performed by the hardware DNS processor on the one or more name service devices, perform, by a second processor on the one or more name service devices, further operations, including:
      provide, by the second processor on the one or more name service devices, a name service reply that includes at least an answer to the name service query; and
      send, by a third processor on the one or more name service devices, the name service reply to the hardware DNS processor on the one or more name service devices, wherein the second and third processors are implemented as software processors to increase an amount of operations over time that are performed by the one or more name service devices; and
   send, by the hardware DNS processor on the one or more name service devices, a name service reply that includes at least an answer to the name service query to the one or more requesting computers;
   perform, by the hardware DNS processor on the one or more name service devices, operations to provide an index value for a software DNS processor lookup table;
   perform, by the hardware DNS processor on the one or more name service devices, operations to provide a program that is associated with the software DNS processor; and
   perform, by the hardware DNS processor on the one or more name service devices, operations based on instructions included in the program;

perform, by the third processor on the one or more name service devices, operations to compare fingerprint information that is based on the at least name service reply with other finger information that is associated with the name service query;

when the comparison provides an affirmative result, perform, by a fourth processor on the one or more name service devices, operations to authenticate the name service reply, wherein the fourth processor is implemented as a software processor; and when the name service query is unresolved by the operation performed by the second processor on the one or more name service devices, perform, by a fourth processor on the one or more name service devices, the further operations, including:

perform, by the fourth processor on the one or more name service devices, operations to provide fingerprint information that is based on at least the name service query;

perform, by the fourth processor on the one or more name service devices, operations to modify the name service query to include the fingerprint information; and send, by the fourth processor on the one or more name service devices, the modified name service query to an external name service server, wherein the fourth processor is implemented as a software processor.

2. The method set forth in claim 1, wherein one or more of the hardware DNS processor, the second processor, or the third processor are on the same name service device.

3. The method set forth in claim 1, further comprising:
receive, by the hardware DNS processor on the one or more name service devices, the name service reply from one or more external name service servers; and
perform, by the second processor on the one or more name service devices, operations to provide fingerprint information that is based on at least the name service reply.

4. The method set forth in claim 1, further comprises:
perform, by the hardware DNS processor on the one or more name service devices, operations to provide a memory address to a program in a memory of an associated processor; and
perform, by the hardware DNS processor on the one or more name service devices, direct memory access to access one or more instructions of the program.

5. The method set forth in claim 1, further comprises, when one or more conditions are met, perform, by a software DNS processor on the one or more name service devices, operations to provide a new program to the hardware DNS processor.

6. One or more name service computing devices comprising:
memory comprising programmed instructions stored in the memory;
one or more hardware DNS processors; and
one or more processors configured to be capable of executing the programmed instructions stored in the memory to:
receive a name service query from one or more requesting computers;
perform, by the one or more hardware DNS processors, one or more operations on the name service query;
when, the name service query is unresolved by the one or more operations performed by the one or more hardware DNS processors, perform, by the one or more processors, further operations, including:

providing a name service reply that includes at least an answer to the name service query; and
sending the name service reply to the one or more hardware DNS processors on the one or more name service computing devices, wherein second, third, and fourth processors are implemented as software processors to increase an amount of operations over time that are performed by the one or more name service computing devices; and
send, by the software processors, a name service reply that includes at least an answer to the name service query to the one or more requesting computers;
perform, by the hardware DNS processor on the one or more name service devices, operations to provide an index value for a software DNS processor lookup table;
perform, by the hardware DNS processor on the one or more name service devices, operations to provide a program that is associated with the software DNS processor; and
perform, by the hardware DNS processor on the one or more name service devices, operations based on instructions included in the program;
perform, by the third processor on the one or more name service devices, operations to compare fingerprint information that is based on the at least name service reply with other finger information that is associated with the name service query;
when the comparison provides an affirmative result, perform, by a fourth processor on the one or more name service devices, operations to authenticate the name service reply, wherein the fourth processor is implemented as a software processor; and
when the name service query is unresolved by the operation performed by the second processor on the one or more name service devices, perform, by a fourth processor on the one or more name service devices, the further operations, including:
perform, by the fourth processor on the one or more name service devices, operations to provide fingerprint information that is based on at least the name service query;
perform, by the fourth processor on the one or more name service devices, operations to modify the name service query to include the fingerprint information; and
send, by the fourth processor on the one or more name service devices, the modified name service query to an external name service server.

7. The one or more name service computing devices set forth in claim 6, wherein one or more of the one or more hardware DNS processors, or the one or more processors are on the same name service computing device.

8. The one or more name service computing devices set forth in claim 6, further comprising:
receive, by the one or more hardware DNS processors, the name service reply from one or more external name service servers; and
perform operations to provide fingerprint information that is based on at least the name service reply.

9. The one or more name service computing devices set forth in claim 6, further comprises:
perform, by the one or more hardware DNS processors on the one or more name service computing devices, operations to provide a memory address to a program in a memory of an associated processor; and perform, by the one or more hardware DNS processors on the one or more name service computing devices, direct memory access to access one or more instructions of the program.

10. The one or more name service computing devices set forth in claim 6, further comprises, when one or more conditions are met, perform, by a software DNS processor on the one or more name service computing devices, operations to provide a new program to the hardware DNS processor.

11. A processor readable non-transitory storage media that includes instructions for managing name service communications, wherein execution of the instructions by one or more processors included in one or more name service devices perform actions comprising:

receive, by a hardware domain name service (DNS) processor on the one or more name service devices, a name service query from one or more requesting computers;

perform, by the hardware DNS processor on the one or more name service devices, one or more operations on the name service query;

when, the name service query is unresolved by the one or more operations performed by the hardware DNS processor on the one or more name service devices, perform, by a second processor on the one or more name service devices, further operations, including:

provide, by the second processor on the one or more name service devices, a name service reply that includes at least an answer to the name service query; and send, by a third processor on the one or more name service devices, the name service reply to the hardware DNS processor on the one or more name service devices, wherein the second and third processors are implemented as software processors to increase an amount of operations over time that are performed by the one or more name service devices; and send, by the hardware DNS processor on the one or more name service devices, a name service reply that includes at least an answer to the name service query to the one or more requesting computers perform, by the hardware DNS processor on the one or more name service devices, operations to provide an index value for a software DNS processor lookup table;

perform, by the hardware DNS processor on the one or more name service devices, operations to provide a program that is associated with the software DNS processor; and perform, by the hardware DNS processor on the one or more name service devices, operations based on instructions included in the program;

perform, by the third processor on the one or more name service devices, operations to compare fingerprint information that is based on the at least name service reply with other finger information that is associated with the name service query;

when the comparison provides an affirmative result, perform, by a fourth processor on the one or more name service devices, operations to authenticate the name service reply, wherein the fourth processor is implemented as a software processor; and when the name service query is unresolved by the operation performed by the second processor on the one or more name service devices, perform, by a fourth processor on the one or more name service devices, the further operations, including:

perform, by the fourth processor on the one or more name service devices, operations to provide fingerprint information that is based on at least the name service query;

perform, by the fourth processor on the one or more name service devices, operations to modify the name service query to include the fingerprint information; and send, by the fourth processor on the one or more name service devices, the modified name service query to an external name service server, wherein the fourth processor is implemented as a software processor.

12. The media set forth in claim 11, wherein one or more of the hardware DNS processor, the second processor, or the third processor are on the same name service device.

13. The media set forth in claim 11, further comprising:
receive, by the hardware DNS processor on the one or more name service devices, the name service reply from one or more external name service servers; and
perform, by the second processor on the one or more name service devices, operations to provide fingerprint information that is based on at least the name service reply.

14. The media set forth in claim 11, further comprises:
perform, by the hardware DNS processor on the one or more name service devices, operations to provide a memory address to a program in a memory of an associated processor; and
perform, by the hardware DNS processor on the one or more name service devices, direct memory access to access one or more instructions of the program.

15. The media set forth in claim 11, further comprises, when one or more conditions are met, perform, by a software DNS processor on the one or more name service devices, operations to provide a new program to the hardware DNS processor.

* * * * *